(12) United States Patent
Yamazaki

(10) Patent No.: US 11,932,191 B2
(45) Date of Patent: Mar. 19, 2024

(54) VEHICULAR SEAT AND OCCUPANT RESTRAINING DEVICE

(71) Applicant: Daicel Corporation, Osaka (JP)

(72) Inventor: Masayuki Yamazaki, Tokyo (JP)

(73) Assignee: Daicel Corporation, Osaka (JP)

( * ) Notice: Subject to any disclaimer, the term of this patent is extended or adjusted under 35 U.S.C. 154(b) by 0 days.

(21) Appl. No.: 18/015,579

(22) PCT Filed: May 25, 2021

(86) PCT No.: PCT/JP2021/019720
§ 371 (c)(1),
(2) Date: Jan. 11, 2023

(87) PCT Pub. No.: WO2022/014168
PCT Pub. Date: Jan. 20, 2022

(65) Prior Publication Data
US 2023/0249639 A1 Aug. 10, 2023

(30) Foreign Application Priority Data
Jul. 14, 2020 (JP) ................. 2020-120890

(51) Int. Cl.
B60R 21/207 (2006.01)
B60R 21/231 (2011.01)
B60R 21/261 (2011.01)

(52) U.S. Cl.
CPC ...... *B60R 21/207* (2013.01); *B60R 21/23138* (2013.01); *B60R 21/261* (2013.01); *B60R 2021/2615* (2013.01)

(58) Field of Classification Search
CPC .......... B60R 21/207; B60R 21/23138; B60R 21/261; B60R 2021/2615
See application file for complete search history.

(56) References Cited

U.S. PATENT DOCUMENTS

| 6,863,298 | B2 * | 3/2005 | Sakai | B60R 22/1952 |
| | | | | 280/728.1 |
| 7,413,220 | B2 * | 8/2008 | Itoga | B60R 22/1952 |
| | | | | 280/741 |
| 9,174,604 | B2 * | 11/2015 | Wellhoefer | B60N 2/42745 |

(Continued)

FOREIGN PATENT DOCUMENTS

| JP | 2007137240 A | * | 6/2007 |
| JP | 2018-135095 A | | 8/2018 |
| JP | 2019-099133 A | | 6/2019 |

OTHER PUBLICATIONS

Written Opinion issued in related International Patent Application No. PCT/JP2021/019720 dated Jul. 20, 2021.

(Continued)

*Primary Examiner* — Faye M Fleming
(74) *Attorney, Agent, or Firm* — Morgan, Lewis & Bockius LLP

(57) ABSTRACT

A vehicular seat includes a first conduit that guides gas from a first gas generator to a first airbag, the first conduit includes a first flexible tube portion having flexibility and disposed along a first side end inside at least one of a seat surface or a seat back, and the first flexible tube portion expands to deform the seat body when the gas supplied to the first airbag from the first gas generator passes through the first flexible tube portion.

19 Claims, 17 Drawing Sheets

(56) References Cited

U.S. PATENT DOCUMENTS

| | | | |
|---|---|---|---|
| 11,447,086 B2 * | 9/2022 | Matsushita | B60R 21/2338 |
| 11,780,397 B2 * | 10/2023 | Ukita | B60R 21/207 |
| | | | 280/730.2 |
| 11,780,398 B2 * | 10/2023 | Fukumoto | F16L 27/08 |
| | | | 280/728.1 |
| 2022/0410833 A1 * | 12/2022 | Ukita | B60R 21/207 |

OTHER PUBLICATIONS

International Search Report issued in related International Patent Application No. PCT/JP2021/019720 dated Jul. 20, 2021.

* cited by examiner

VEHICULAR SEAT AND OCCUPANT RESTRAINING DEVICE

TECHNICAL FIELD

The present invention relates to a vehicular seat and an occupant restraining device provided to the vehicular seat.

BACKGROUND ART

A known vehicular seat on which an occupant of a vehicle sits is provided with an airbag (side airbag), for protection against side collision, with which the occupant is restrained and protected in the event of side collision. Such a vehicular seat is configured to protect an occupant from impact, by supplying gas from an inflator (gas generator) to an airbag to inflate an airbag between the occupant and a side surface structure (a vehicle door for example) of a vehicle when a side collision is detected.

In relation to the above, Patent Document 1 discloses an occupant protection device more reliably protecting an occupant by forming a gap between an occupant and a door in the event of side collision. The gap is formed by inflating an airbag between the door and the armpit of the occupant so as to rotate the upper body of the occupant while lifting the arm of the occupant on the door side. Patent Document 2 discloses an occupant posture control device that expands an airbag inside a seat to change the shape of the seat for changing the posture of the occupant in accordance with the behavior of the vehicle.

CITATION LIST

Patent Document

Patent Document 1: JP 2018-135095 A
Patent Document 2: JP 2019-99133 A

SUMMARY OF INVENTION

Technical Problem

Generally, an airbag provided to a vehicular seat is arranged to correspond to a certain part (shoulders or a chest, for example) of the occupant's body, assuming that the occupant is seated in an appropriate posture. However, in a case in which an occupant is not be seated in an appropriate posture when the airbag is inflated, for example, in a case in which left-right positions of the seat are displaced from a proper position, or the upper body of the occupant is leaned to the left or right, the airbag inflated may fail to appropriately protect the intended body part, and the effect of a side airbag device may not be achieved as expected. In view of this, the occupant's posture may be corrected by expanding an airbag inside the seat. However, in such a configuration, a space is required for accommodating an airbag for protecting an occupant by inflating outside the seat and an airbag for correcting a posture of the occupant by expanding inside the seat, which leads to an increase in size of the seat.

The technique of the present disclosure is made in view of the above, and an object of the present disclosure is to provide a technique that makes it possible to reduce the thickness of a vehicular seat equipped with airbags, while providing more reliable protection for occupants.

Solution to Problem

To solve the above problems, the technique according to the present disclosure employs the following configuration.

Specifically, the technique of the present disclosure relates to a vehicular seat on which an occupant of a vehicle sits, the vehicular seat including: a seat body including a seat surface that supports buttocks of the occupant and a seat back that supports a back of the occupant; a first gas generator provided to the seat body; a first airbag that is disposed inside the seat back and, by gas supplied from the first gas generator when the first gas generator operates, protrudes and inflates from a first side end which is one of side ends in a width direction of the seat body; and a first conduit that guides the gas from the first gas generator to the first airbag, wherein the first conduit includes a first flexible tube portion having flexibility and disposed along the first side end inside at least one of the seat surface or the seat back, and the first flexible tube portion expands to deform the seat body when the gas supplied from the first gas generator to the first airbag passes through the first flexible tube portion.

With the vehicular seat of the present disclosure, the first airbag disposed in the seat back inflates on the first side end, to protect the upper body of the occupant on the first side end side. Thus, the occupant is protected from an impact on the first side end side. Furthermore, with the vehicular seat of the present disclosure, since the first flexible tube portion is disposed inside the seat body and along the first side end, the deformation of the seat body caused by expansion of the first flexible tube portion can correct the seated posture closer the first side end than the proper posture, to the proper posture. Specifically, the vehicular seat of the present disclosure includes the first airbag that inflates on the first side end of the seat body to protect the occupant from an impact, and the first flexible tube portion that expands inside the seat body to correct the seated posture of the occupant. In the vehicular seat of the present disclosure, the first flexible tube portion having flexibility is formed of at least part of the first conduit that guides gas from the first gas generator to the first airbag. Therefore, in the process in which the gas supplied from the first gas generator to the first airbag passes through the first conduit, the first flexible tube portion expands, and the seat body is deformed. Specifically, before the first airbag inflates, the seated posture of the occupant is corrected with the first flexible tube portion expanded to deform the seat body. Thus, the first airbag inflates in a state where the seated posture of the occupant has been corrected. Since the posture of the occupant is corrected before the first airbag is inflated, the first airbag can be inflated so as to correspond to an intended body part. As a result, according to the vehicular seat of the present disclosure, the occupant can be reliably protected. Furthermore, with the first conduit used as a member for correcting the seated posture of the occupant, the installation space inside the seat body can be reduced as compared with the case where another airbag is separately provided. As a result, the technique of the present disclosure can contribute to reduce the thickness and weight of the vehicular seat.

In the vehicular seat of the present disclosure, the first flexible tube portion may include a first seat surface side flexible tube portion disposed along the first side end in the seat surface, and a first back side flexible tube portion disposed along the first side end in the seat back.

With this configuration, the expansion of the first seat surface side flexible tube portion deforms the seat surface to correct the posture of the occupant's lower body, and the expansion of the first back side flexible tube portion deforms the seat back to correct the posture of the occupant's upper body. Thus, with the vehicular seat of the present disclosure, before the first airbag inflates, the postures of the lower body and the upper body of the occupant can both be corrected.

As a result, the first airbag can inflate in a state where the seated posture of the occupant is more appropriately corrected, whereby the occupant can be more reliably protected.

In the vehicular seat of the present disclosure, the seat back may be connected to the seat surface so as to be reclinable with respect to the seat surface, and the first flexible tube portion may further include a first connection flexible tube portion disposed across a connection portion between the seat surface and the seat back.

In the vehicular seat having the seat back reclinable with respect to the seat surface, when the first seat surface side flexible tube portion is disposed in the seat surface, and the first back side flexible tube portion is disposed in the seat back, the first conduit needs to correspond to the reclining of the seat back. In such a case, in the vehicular seat of the present disclosure, the first connection flexible tube portion having flexibility is disposed across the connection portion between the seat surface and the seat back so that the first connection flexible tube portion deforms in response to the reclining of the seat back. As a result, fatigue fracture of the first conduit due to the reclining of the seat back can be suppressed. That is, the durability of the first conduit can be improved.

Furthermore, in the first flexible tube portion of the vehicular seat described above, the first seat surface side flexible tube portion, the first connection flexible tube portion, and the first back side flexible tube portion may be integrally formed by a single member.

The vehicular seat of the present disclosure may further include: a second airbag that is disposed inside the seat back and upon being supplied with gas from the first gas generator, protrudes and inflates from a second side end that is another one of the side ends in the width direction of the seat body; and a connection tube connecting the first conduit and the second airbag so that the gas flowing through the first conduit is supplied to the second airbag after the gas is supplied to the first airbag.

In the vehicular seat of the present disclosure, the second airbag inflates on the second side end of the seat body to protect the upper body of the occupant on the second side end side. Here, when the first airbag inflates to protect the occupant from the impact on the first side end side, the occupant may lean toward the second side end side due to the reaction against the impact. In view of this, in the vehicular seat of the present disclosure, the connection tube supplies the gas to the second airbag after the first airbag, and thus the second airbag can inflate after the first airbag inflates. In view of this, the first flexible tube portion first expands to correct the posture of the occupant, and then the first airbag inflates to protect the occupant from the impact on the first side end side. Then, the second airbag inflates to protect the occupant, thereby preventing the occupant from largely leaning toward the second side end. That is, in the vehicular seat of the present disclosure, the second airbag can inflate at a timing when the posture of the occupant is about to be inclined due to the reaction against the impact, whereby the occupant can be more reliably protected. With the vehicular seat of the present disclosure, the first airbag and the second airbag inflate at different timings. Thus, when the vehicular seats of the present disclosure are disposed inside a vehicle to be arranged side by side, interference caused by simultaneous inflation of the first airbag and the second airbag of the seats adjacent to each other can be prevented.

The vehicular seat of the present disclosure may further include: a third airbag that is disposed inside the seat back, and upon being supplied with the gas from the first gas generator, protrudes and inflate at an upper end portion of the seat body; and a branch tube that is branched from an intermediate part of the connection tube to guide the gas to the third airbag.

The third airbag inflates from the upper end portion of the seat body to protect the head of the occupant. When the first airbag and the second airbag protect the upper body of the occupant in a state in which the occupant's head is shaken by the impact of the side collision, a load may be applied to the occupant's neck. In view of this, with the vehicular seat of the present disclosure, the third airbag protects the head of the occupant in addition to protecting the upper body of the occupant by the first airbag and the second airbag, whereby the load to the neck of the occupant can be reduced. As a result, the occupant can be more reliably protected.

The vehicular seat of the present disclosure may further include: a second gas generator provided to the seat body; a second airbag that is disposed inside the seat back and, by gas supplied from the second gas generator when the second gas generator operates, protrudes and inflates from a second side end which is another one of the side ends in the width direction of the seat body; and a second conduit configured to guide the gas from the second gas generator to the second airbag, wherein the second conduit may include a second flexible tube portion having flexibility and disposed along the second side end inside at least one of the seat surface or the seat back, and the second flexible tube portion may expand to deform the seat body when the gas supplied from the second gas generator to the second airbag passes through the second flexible tube portion.

The vehicular seat of the present disclosure may further includes: a second airbag that is disposed inside the seat back and, by gas supplied from the first gas generator when the first gas generator operates, protrudes and inflates from a second side end which is another one of the side ends in the width direction of the seat body; and a second conduit configured to guide the gas from the first gas generator to the second airbag, and the first gas generator may include a first gas discharge port to which the first conduit is connected, and a second gas discharge port to which the second conduit is connected, the second gas discharge port being independent from the first gas discharge port, the second conduit may include a second flexible tube portion having flexibility and disposed along the second side end inside at least one of the seat surface or the seat back, and the second flexible tube portion may expand to deform the seat body when the gas supplied from the second gas generator to the first airbag passes through the second flexible tube portion.

Thus, in the vehicular seat of the present disclosure, the second airbag may inflate independently from the first airbag. Thus, the occupant can be protected from the impact on the second side end side with the second airbag inflated without supplying the gas to the first airbag. Furthermore, with the vehicular seat of the present disclosure, since the second flexible tube portion is disposed inside the seat body and along the second side end, the deformation of the seat body caused by the expansion of the second flexible tube portion can correct the seated posture closer to the second side end than the proper posture, to the proper posture. In the vehicular seat of the present disclosure, the second flexible tube portion having flexibility is formed by at least part of the second conduit through which gas is guided to the second airbag. Thus, the second flexible tube portion expands before the second airbag inflates, to deform the seat body and correct the seated posture of the occupant. Thus, the second airbag inflates in a state where the seated posture of the occupant has been corrected. As a result, according to the vehicular seat of the present disclosure, the occupant can be more reliably protected.

In the vehicular seat of the present disclosure, the first side end may be a side end, of side ends in the width direction of the seat body, facing a side surface structure of the vehicle in a state where the vehicular seat is installed in the vehicle.

In the present disclosure, the side surface structure of the vehicle is a structure (doors or a rear fender of a vehicle, for example) forming a side surface of the vehicle body. Thus, the side surface structure is a part, of the vehicle, subject to collision at an event of side collision. Thus, when the vehicular seats are arranged side by side inside the vehicle, protection of the occupant against impact from the side surface structure side (so called "near side") has a higher priority than protection against impact from the adjacent seat side (so called "far side"). The vehicular seat of the present disclosure can suitably protect the occupant against impact on the side of the side surface structure, by making the first side end where the first airbag inflates and the first flexible tube portion F1 expands the side facing the side surface structure.

The technique of the present disclosure may be specified as an occupant restraining device provided to the vehicular seat. Specifically, the technique of the present disclosure may be an occupant restraining device provided to a vehicular seat that includes a seat body including a seat surface that supports buttocks of an occupant of a vehicle and a seat back that supports a back of the occupant, the occupant restraining device including: a first gas generator provided to the seat body; a first airbag that is disposed inside the seat back and, by gas supplied from the first gas generator when the first gas generator operates, protrudes and inflates from a first side end which is one of side ends in the width direction of the seat body; and a first conduit that guides the gas from the first gas generator to the first airbag, wherein the first conduit includes a first flexible tube portion having flexibility and disposed along the first side end inside at least one of the seat surface or the seat back, and the first flexible tube portion expands to deform the seat body when the gas supplied from the first gas generator to the first airbag passes through the first flexible tube portion.

Advantageous Effects of Invention

With the technique according to the present disclosure, a vehicular seat equipped with an airbag can reduce the thickness of the seat and can more reliably protect an occupant.

DESCRIPTION OF EMBODIMENTS

Embodiments of the present disclosure will be described below with reference to the drawings. Note that each of the configurations, combinations thereof, and the like in each embodiment is an example, and additions, omissions, substitutions, and other changes of the configuration may be made as appropriate without departing from the spirit of the present invention. The present disclosure is not limited by the embodiment, but only by the claims.

First Embodiment

Figure 1:
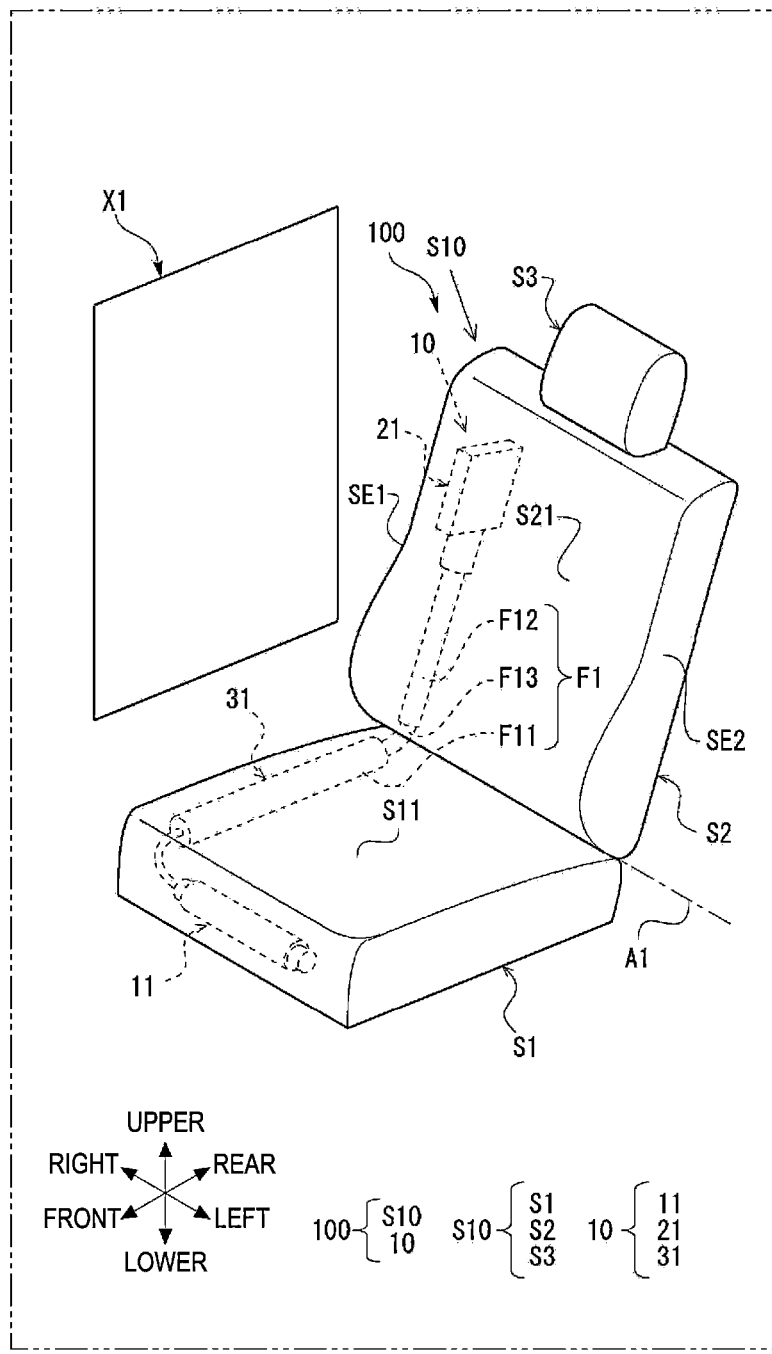
FIG. 1 is a perspective view illustrating a state before an airbag device of a vehicular seat according to a first embodiment is operated.
Figure 2:
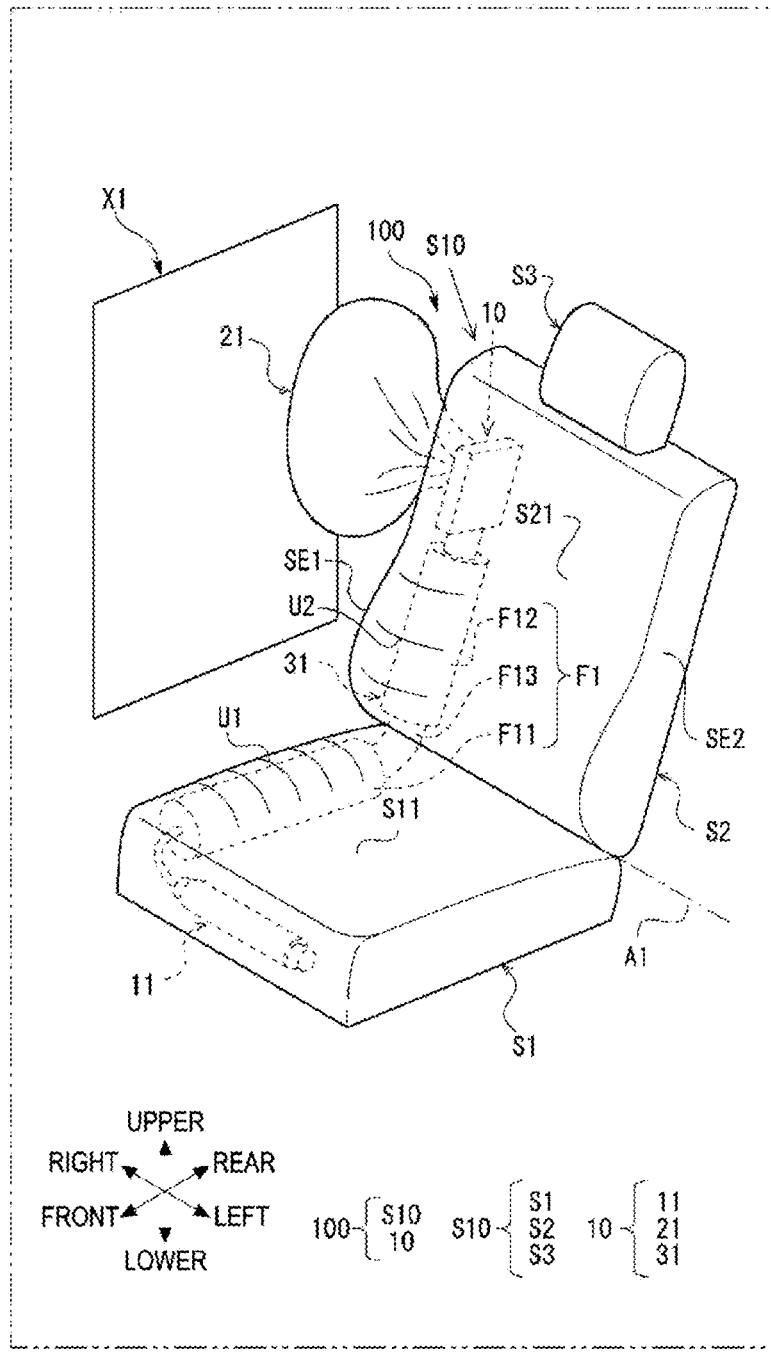
FIG. 2 is a perspective view illustrating a state after the airbag device of the vehicular seat according to the first embodiment is operated.

FIG. 1 and FIG. 2 are perspective views of a vehicular seat according to a first embodiment. FIG. 1 illustrates a state before an airbag device (occupant restraining device) of the vehicular seat is operated, and FIG. 2 illustrates a state where the airbag device is operated. A vehicular seat 100 is a seat on which an occupant of the vehicle sits. The vehicular seat 100 according to the present embodiment is disposed inside the vehicle for a driver's seat. Note that, in the present specification, a front-rear direction (depth direction), a left-right direction (width direction), and an up-down direction (height direction) of the vehicular seat 100 will be described respectively with reference to a front-rear direction, a left-right direction, and an up-down direction viewed from an occupant (seated person) seated in the vehicular seat 100.

Overall Configuration

As illustrated in FIG. 1 and FIG. 2, the vehicular seat 100 includes a seat body S10 that supports the body of an occupant, and an airbag device 10 disposed inside the seat body S10. The seat body S10 includes a seat surface (seat cushion portion) S1 that supports the buttocks of the occupant, a seat back (backrest portion) S2 that supports the back of an occupant, and a headrest S3 that supports the head of an occupant, corresponding to each part of the body of an occupant seated. The seat back S2 is connected to the rear end portion of the seat surface S1 and is provided so as to be reclinable with respect to the seat surface S1. According to the vehicular seat 100, the seat back S2 pivots about a pivot axis A1 in response to an operation of the occupant, so that the seat back S2 can be switched from upright posture illustrated in FIG. 1 to a reclined posture. The headrest S3 is connected to the upper end portion of the seat back S2 and provided so as to be vertically movable with respect to the seat back S2.

Reference numeral X1 in FIGS. 1 and 2 denotes a side surface structure of the vehicle. The side surface structure X1 is a structure forming a side surface of the vehicle body. That is, the side surface structure X1 is a part, of the vehicle, subject to collision at an event of side collision. The side surface structure X1 is a door or a rear fender of the vehicle, for example. In the present embodiment, of side ends of the seat body S10 in the width direction, a side end (right side end) of a side facing the side surface structure X1 (so-called "near side") is defined as a first side end SE1, a side end (left side end) on the opposite side (so called "far side") is defined as a second side end SE2.

[Airbag Device]

Figure 3:
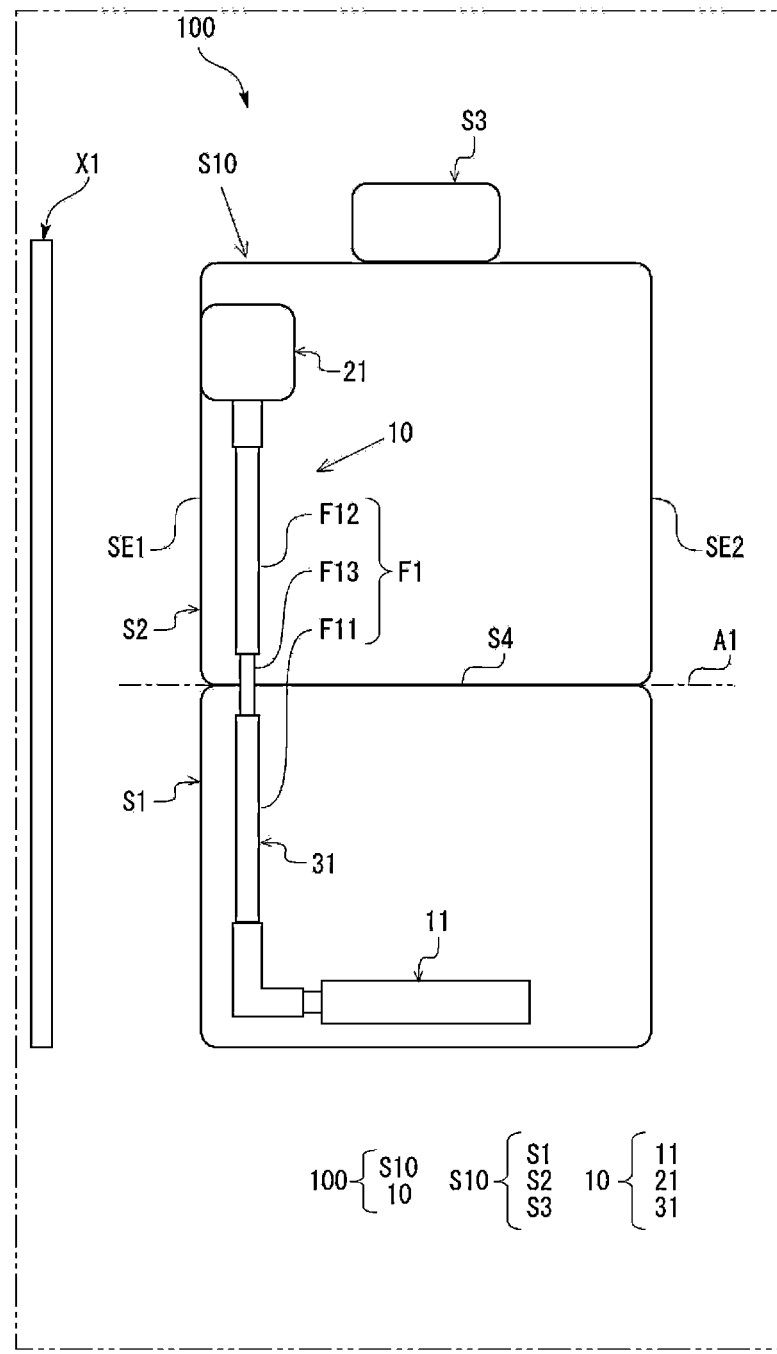
FIG. 3 is a schematic view illustrating the vehicular seat before the airbag device is operated according to the first embodiment.

As illustrated in FIG. 2, the airbag device 10 inflates the airbag at the event of collision of the vehicle to hold and restrain an occupant, for protecting the occupant from the impact of the side collision. FIG. 3 is a schematic view illustrating the vehicular seat 100 before the airbag device 10 is operated. As illustrated in FIG. 3, the airbag device 10 includes a first gas generator 11 provided to the seat body S10, a first airbag 21 disposed in the seat back S2, and a first conduit 31 that connects the first gas generator 11 and the first airbag 21. Each component of the airbag device 10 will be described below.

[First Gas Generator]

The first gas generator 11 is disposed inside the seat surface S1 of the seat body S10 to supply gas to the first airbag 21. The first gas generator 11 is formed in a cylindrical shape with both ends closed (cylindrical shape), and emits gas therein upon being operated under the control by an airbag ECU provided in the vehicle. Note that the method in which the gas generator according to the present disclosure generates gas is not particularly limited. Examples of the types of the gas generator includes a pyro-type that generates gas by combusting a solid gas generating agent, a stored gas-type that uses pressurized gas, and a hybrid type combining the pyro-type and the stored gas-type.

The present embodiment employs a structure in which no gas generator is disposed in the seat back S2, and the gas is supplied to the first airbag 21 from the first gas generator 11 disposed in the seat surface S1. Thus, the thickness of the seat back can be reduced, compared to a structure in which the gas generator is disposed in the seat back. Still, in the present disclosure, the location where the gas generator is disposed is not limited to the seat surface. The first gas generator may be disposed, for example, inside the seat back.

[First Airbag]

The first airbag 21 is a shoulder airbag or a torso airbag on the first side end SE1 side, that is a near-side airbag, and is disposed (stored) inside the seat back S2 so as to correspond to the shoulder or the chest of the occupant. The first airbag 21 protrudes and inflates from the first side end SE1 of the seat body S10 (seat back S2), upon being expanded by the gas supplied from the first gas generator 11 (see FIG. 2). The first airbag 21 is inflated to the outside of the seat back S2 on the first side end SE1 and holds the shoulder or the chest of the occupant on the first side end SE1 side, whereby the occupant is protected from impact on the first side end SE1 side (near side).

[First Conduit]

The first conduit 31 is a flow tube in which the gas can flow, and is configured to guide the gas from the first gas generator 11 to the first airbag 21. As illustrated in FIG. 3, the first conduit 31 has one end connected to the first gas generator 11 and has the other end connected to the first airbag 21. Thus, an internal space in the first conduit 31 forms a flow path for the gas to flow from the first gas generator 11 to the first airbag 21.

Part of this first conduit 31 is formed as a first flexible tube portion having flexibility. In FIG. 3, the first flexible tube portion is denoted by reference numeral F1. The first flexible tube portion F1 is disposed along the first side end SE1 inside the seat body S10. More specifically, the first flexible tube portion F1 is disposed to be positioned between the first side end SE1 and the occupant seated on the vehicular seat 100. The first flexible tube portion F1 according to the present embodiment is formed by cloth (fabric) and thus flexible. The first flexible tube portion F1 has a surface coated to prevent leakage of gas, passing therein, through spaces between threads. The first flexible tube portion F1 may be coated using coating agent including silicon as a main component. The first flexible tube portion F1 is in a deflated or folded state when no gas is passing therethrough, and is expanded, when gas passes therethrough by the pressure of the gas, to increase the flow path cross-sectional area.

As illustrated in FIG. 3, the first flexible tube portion F1 includes a first seat surface side flexible tube portion F11, a first back side flexible tube portion F12, and a first connection flexible tube portion F13. The first seat surface side flexible tube portion F11 is disposed in the seat surface S1 and along the first side end SE1. The first back side flexible tube portion F12 is disposed along the first side end SE1 in the seat back S2. The first connection flexible tube portion F13 is disposed to cross a connection portion S4 between the seat surface S1 and the seat back S2. In the first flexible tube portion F1, the first seat surface side flexible tube portion F11, the first connection flexible tube portion F13, and the first back side flexible tube portion F12 are integrally formed by a single member. In the flow path in which the gas flows from the first gas generator 11 to the first airbag 21, the first back side flexible tube portion F12 is positioned downstream of the first seat surface side flexible tube portion F11, and a downstream end portion of the first seat surface side flexible tube portion F11 and an upstream end portion of the first back side flexible tube portion F12 are connected to each other through the first connection flexible tube portion F13.

[Airbag Inflation Operation]

Figure 4:
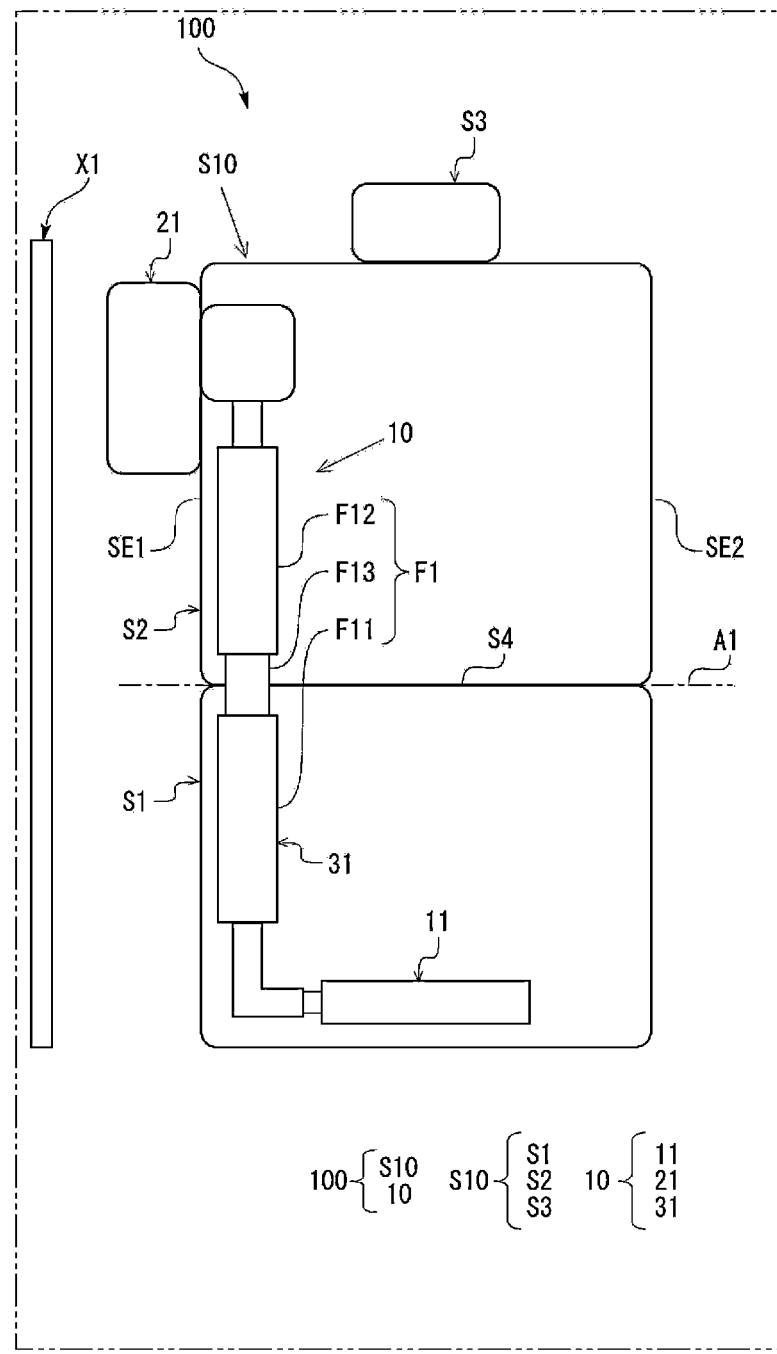
FIG. 4 is a schematic view illustrating the vehicular seat after the airbag device is operated according to the first embodiment.

Next, an inflation operation of the first airbag 21 performed when the airbag device 10 is operated in the vehicular seat 100 according to the present embodiment will be described. FIG. 4 is a schematic view illustrating the vehicular seat 100 when the airbag device 10 is operated. In this example, a case is described where an impact is applied to the first side end SE1 side (near side) due to side collision on the side surface structure X1 of the vehicle. When the airbag ECU detects the side collision of a vehicle based on a signal from a collision sensor (not illustrated), an operation current (ignition current) is supplied to the first gas generator 11. As a result, the first gas generator 11 is operated, and the gas is emitted from the first gas generator 11. The gas emitted from the first gas generator 11 flows through the first conduit 31 and flows into the first airbag 21. As described above, the gas emitted from the first gas generator 11 is guided to the first conduit 31 and supplied to the first airbag 21 to expand the first airbag 21. As a result, as illustrated in FIG. 4, the first airbag 21 protrudes and inflates, from the first side end SE1 toward the outside of the seat back S2.

[Inflation Operation of First Flexible Tube Portion]

The first airbag 21 provided in the vehicular seat 100 is disposed to correspond to the shoulder or the chest of the occupant, assuming that the occupant is seated in an appropriate posture. Hereinafter, an appropriate seated posture of the occupant required for the occupant to be effectively protected by the airbag will be referred to as a "proper posture", and a position of the occupant or each part of the body of the occupant in the proper posture will be referred to as a "proper position". More specifically, the proper posture refers to a state where the occupant is facing the forward side of the vehicular seat, and the occupant's body is positioned substantially at the center of the seat surface S1 and the seat back S2 in the left-right direction, and the occupant's legs extend forward from the seat surface S1. The occupant is not necessarily always seated in the proper posture. The seated position in the left-right direction may be deviated from the proper position, or the upper body of the occupant may be tilted to the left or right. For example, when the occupant is leaning against the side surface structure X1, the posture of the occupant is closer to the first side end SE1 (closer to the near side) than the proper posture. If the occupant is taking a posture closer to the first side end SE1 when the first airbag 21 is inflated, a situation may occur in which an enough space for inflating the first airbag 21 is not secured between the side surface structure X1 and the occupant's body, or the shoulders or the chest of the occupant are not positioned at the inflation position of the first airbag 21. As a result, the first airbag 21 inflated may not appropriately protect the occupant, and thus the effect of the first airbag 21 may not be obtained as expected.

On the other hand, the vehicular seat 100 according to the present embodiment has the first flexible tube portion F1 correcting the posture of the occupant before the first airbag 21 inflates at the event of side collision, so that the effect of the first airbag can be sufficiently exerted. This will be described in detail below.

As described above, the first flexible tube portion F1 is formed to be flexible so as to be expanded by the pressure of the gas passing therethrough. Thus, as illustrated in FIG. 4, in a process in which the gas flows through the first conduit 31 and is supplied to the first airbag 21 from the first gas generator 11, the first flexible tube portion F1 is expanded by the gas passing through the first flexible tube portion F1. The expansion of the first flexible tube portion F1 causes deformation of the seat body S10 as illustrated in FIG. 2. Specifically, when the first seat surface side flexible tube portion F11 expands, the seat surface S1 deforms, and when the first back side flexible tube portion F12 expands, the seat back S2 deforms. In the gas flow path, the first back side flexible tube portion F12 is positioned downstream of the first seat surface side flexible tube portion F11, thus the first back side flexible tube portion F12 is expanded after the first seat surface side flexible tube portion F11.

Figure 5:
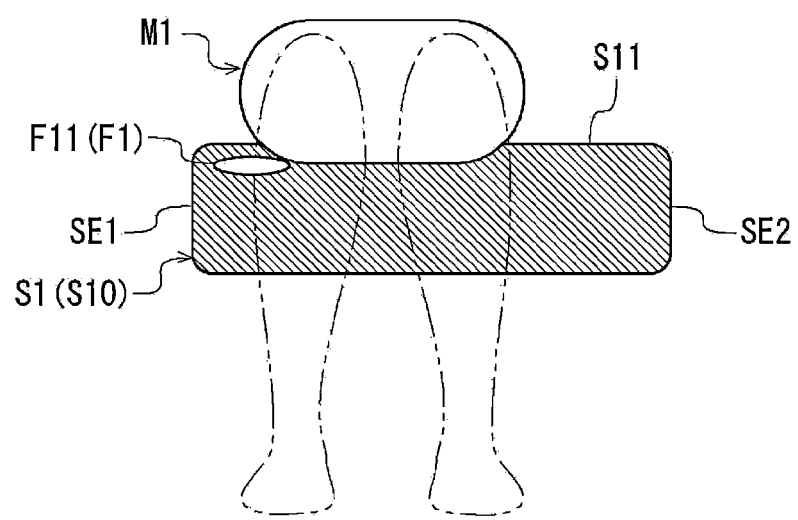
FIG. 5 is a diagram illustrating a first seat surface side flexible tube portion in a state before gas passes therethrough.
Figure 6:
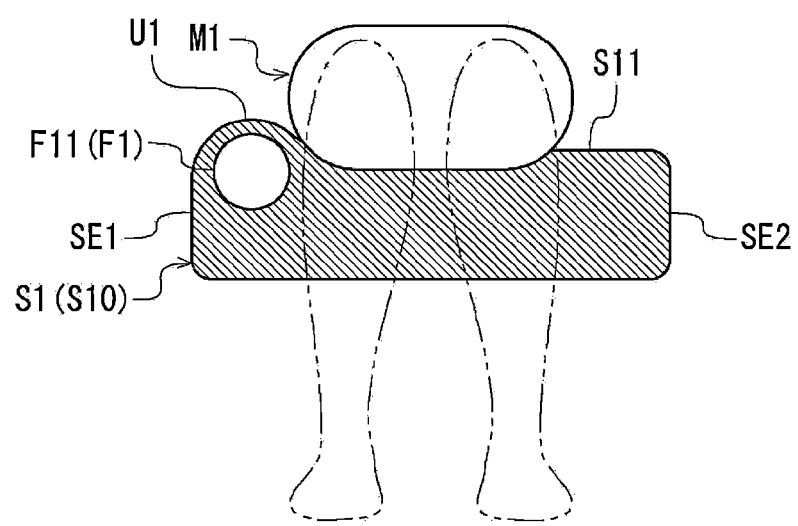
FIG. 6 is a diagram illustrating the first seat surface side flexible tube portion in a state where the gas is passing therethrough.
Figure 7:
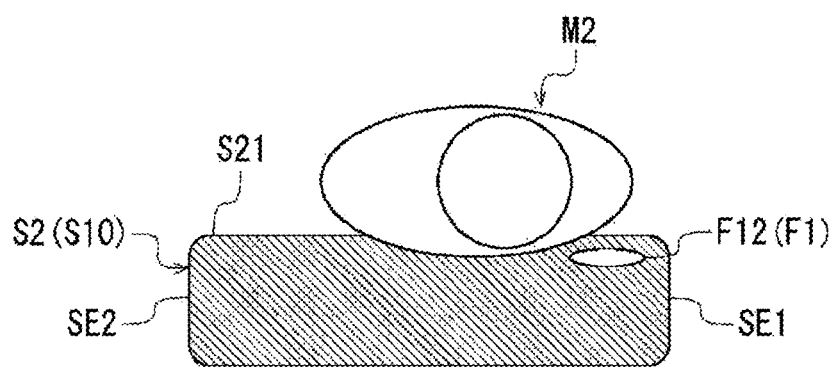
FIG. 7 is a diagram illustrating a first back side flexible tube portion in a state before the gas passes therethrough.
Figure 8:
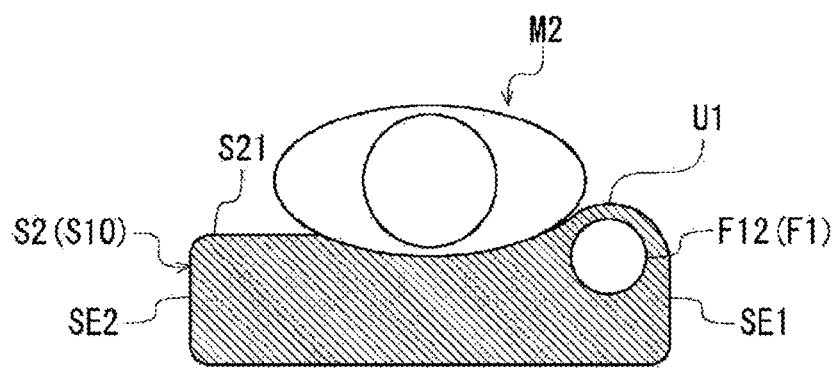
FIG. 8 is a diagram illustrating the first back side flexible tube portion in a state where the gas is passing therethrough.

FIG. 5 is a diagram illustrating the first seat surface side flexible tube portion F11 in a state before the gas passes therethrough. FIG. 6 is a diagram illustrating the first seat surface side flexible tube portion F11 in a state where the gas is passing therethrough. FIG. 5 and FIG. 6 illustrate a cross section orthogonal to the front-rear direction of the seat surface S1. Reference numeral M1 in FIG. 5 and FIG. 6 denotes the lower body of an occupant. Reference numeral S11 denotes a supporting surface (i.e., seat), of the seat surface that supports the buttocks of an occupant. FIG. 7 is a diagram illustrating the first back side flexible tube portion F12 in a state before the gas passes therethrough. FIG. 8 is a diagram illustrating the first back side flexible tube portion F12 in a state where the gas is passing therethrough. FIG. 7 and FIG. 8 illustrate a cross section orthogonal to the up-down direction of the seat back S2. The reference numeral M2 in FIG. 7 and FIG. 8 indicates the upper body of an occupant. Reference numeral S21 denotes a supporting surface of the seat back (i.e., the front surface of the seat back), supporting the back of an occupant. The operation of the first flexible tube portion F1 will be described with reference to an example case where the lower body M1 and the upper body M2 of the occupant are positioned closer to the first side end SE1 (closer to the near side) than the proper position before the airbag device 10 is operated, as illustrated in FIG. 5 and FIG. 7.

Before the first gas generator 11 operates and the gas flows through the first conduit 31, the first seat surface side flexible tube portion F11 and the first back side flexible tube portion F12 are in a flattened state or in a folded state as illustrated in FIG. 5 and FIG. 7. When the first gas generator 11 is operated and the gas flows in the first conduit 31, the gas first flows through the first seat surface side flexible tube portion F11 positioned upstream of the first back side flexible tube portion F12. In this process, as illustrated in FIG. 6, the gas passing through the first seat surface side flexible tube portion F11 makes the first seat surface side flexible tube portion F11 expand inside the seating surface S1 so as to have a circular cross section. As a result, the seat surface S1 deforms so that the supporting surface S11 on the first side end SE1 side is raised. Since the first seat surface side flexible tube portion F11 is disposed inside the seat surface S1 and along the first side end SE1, a swelling U1 is formed along the first side end SE1 of the seat surface S1. The swelling U1 is formed to be positioned between the occupant and the first side end SE1 of the vehicular seat 100. The deformation of the seat surface S1 pushes and moves the lower body M1 of the occupant, and the lower body M1 of the occupant, which has been positioned close to the first side end SE1, moves to the proper position as illustrated in FIG. 6. After passing through the first seat surface side flexible tube portion F11, the gas passes through the first connection flexible tube portion F13, and then passes through the first back side flexible tube portion F12. In this process, as illustrated in FIG. 8, the gas passing through the first back side flexible tube portion F12 makes the first back side flexible tube portion F12 expand inside the seat back S2 to have a circular cross section. As a result, the seat back S2 deforms so that the supporting surface S21 on the first side end SE1 side is raised. Since the first back side flexible tube portion F12 is disposed inside the seat back S2 and along the first side end SE1, a swelling U1 is formed along the first side end SE1 of the seat back S2. The deformation of the seat back S2 pushes and moves the upper body M2 of the occupant, and the upper body M2 of the occupant, which has been positioned close to the first side end SE1, moves to the proper position as illustrated in FIG. 8. As described above, in the process in which the gas flows through the first conduit 31 and reaches the first airbag 21 from the first gas generator 11, the first seat surface side flexible tube portion F11 is first expanded to move the position of the lower body M1 of the occupant to the proper position, and then the first back side flexible tube portion F12 is expanded to move the position of the upper body M2 to the proper position. Thus, the posture of the occupant is corrected to be the proper posture before the first airbag 21 inflates. Thus, the first airbag 21 inflates in a state where the occupant is seated in the proper posture. As a result, the first airbag 21 can hold the shoulder or the chest of the occupant on the first side end SE1 side, whereby the occupant is appropriately protected from the impact on the first side end SE1 side (near side).

[Actions and Effects]

As described above, in the vehicular seat 100 according to the present embodiment, the first conduit 31 that guides the gas from the first gas generator 11 to the first airbag 21 includes the first flexible tube portion F1 having flexibility and disposed inside the seat body S10 and along the first side end SE1. The first flexible tube portion F1 is configured to be expanded by the gas passing therethrough to be supplied to the first airbag 21 from the first gas generator 11, to deform the seat body S10. At this time, since the first flexible tube portion F1 is disposed inside the seat body S10 and along the first side end SE1, the deformation of the seat body S10 caused by the expansion of the first flexible tube portion F1 can correct the seated posture closer to the first side end SE1 (closer to the near side) than the proper posture, to the proper posture. In the vehicular seat 100 according to the present embodiment, the first flexible tube portion F1 having flexibility is formed as at least part of the first conduit 31 that guides the gas from the first gas generator 11 to the first airbag 21. Therefore, in the process in which the gas supplied from the first gas generator 11 to the first airbag 21 passes through the first conduit 31, the first flexible tube portion F1 expands and deforms the seat body S10. Specifically, before the first airbag 21 inflates, the first flexible tube portion F1 is expanded to deform the seat body S10 so that the seated posture of the occupant is corrected. Thus, the first airbag 21 inflates in a state where the seated posture of the occupant has been corrected. Since the posture of the occupant is corrected before the inflation of the first airbag 21, the first airbag 21 can inflate so as to correspond to the shoulder or the chest, which is an intended body part, of the occupant on the first side end SE1 side (near side). As a result, according to the vehicular seat 100, the effect of the first airbag 21 can be sufficiently exerted, and the occupant can be reliably protected. A similar effect can be obtained also when the occupant is seated in the proper posture, since the deformation of the seat body S10 caused by the expansion of the first flexible tube portion F1 maintains the proper posture of the occupant.

Here, as a possible alternative configuration for correcting the seated posture of the occupant, an airbag for correcting the posture of the occupant and a conduit for guiding gas to the airbag may be provided to the seat body S10, separately from the first airbag 21 and the first conduit 31, and this airbag may be expanded inside the seat body to correct the posture of the occupant. However, when such a configuration is employed, a large installation space is required inside the seat body S10, which may cause an increase in the size and weight of the vehicular seat. In view of this, the vehicular seat 100 according to the present embodiment uses the first conduit 31 for guiding the gas from the first gas generator 11 to the first airbag 21, as a member for correcting the seated posture of the occupant. With this configuration, the installation space inside the seat body can be reduced, compared with the configuration in which an airbag for correcting the posture of the occupant, a conduit required for the airbag, and the like are separately disposed. As a result, the vehicular seat 100 can be made thin.

At least part of the first conduit of the present disclosure is formed as the first flexible tube portion. For example, the entire first conduit 31 may be formed as the first flexible tube portion F1 having flexibility.

The first flexible tube portion F1 according to the present embodiment includes the first seat surface side flexible tube portion F11 disposed in the seat surface S1 and along the first side end SE1, and the first back side flexible tube portion F12 disposed in the seat back S2 and along the first side end SE1. With this configuration, when the first seat surface side flexible tube portion F11 is expanded, the seat surface S1 deforms to correct the posture of the lower body M1 of the occupant, and when the first back side flexible tube portion F12 is expanded, the seat back S2 deforms to correct the posture of the upper body M2 of the occupant. Thus, the postures of the lower body M1 and the upper body M2 of the occupant can both be corrected before the first airbag 21 inflates. As a result, the first airbag 21 can inflated in a state where the seated posture of the occupant is more appropriately corrected, whereby the occupant can be more reliably protected.

Here, since the occupant is seated with the buttocks as a fulcrum, a change in the posture of the lower body M1 involves a change in the posture of the upper body M2. Since the swing width of the body of the occupant increases from the buttocks to the head, even a small change in the posture of the lower body M1 leads to a large change in the posture of the upper body M2. This means that when the posture of the lower body M1 of the occupant is corrected, the posture of the upper body M2 is also corrected to some extent at the same time. In the vehicular seat 100 according to the present embodiment, in the flow path through which the gas flows from the first gas generator 11 to the first airbag 21, the first back side flexible tube portion F12 is disposed downstream of the first seat surface side flexible tube portion F11, and thus the first back side flexible tube portion F12 expands after the first seat surface side flexible tube portion F11. Thus, after the posture of the lower body M1 of the occupant is corrected by the deformation of the seat surface S1 caused by the expansion of the first seat surface side flexible tube portion F11, the posture of the upper body M2 of the occupant is corrected by the deformation of the seat back S2 caused by the expansion of the first back side flexible tube portion F12. Thus, the correction of the posture of the upper body M2 by the first back side flexible tube portion F12 is started in a state where the posture of the upper body M2 is corrected to some extent by correcting the lower body M1 of the occupant by the first seat surface side flexible tube portion F11. As a result, the amount of change in posture required for correcting the posture of the upper body M2 by the first back side flexible tube portion F12 can be reduced, whereby the posture of the occupant can be efficiently corrected. To facilitate this effect, the flow path cross-sectional area of the first back side flexible tube portion F12 expanded may be set to be larger than the flow path cross-sectional area of the first seat surface side flexible tube portion F11 expanded.

Note that the first flexible tube portion of the present disclosure may be disposed along the first side end inside at least one of the seat surface and the seat back. For example, the first flexible tube portion F1 may be disposed only in the seat surface S1 so as to extend along the first side end SE1, or may be disposed only in the seat back S2 so as to extend along the first side end SE1. Thus, the first flexible tube portion of the present disclosure includes at least one of the first seat surface side flexible tube portion and the first back side flexible tube portion.

In the vehicular seat 100 according to the present embodiment, the seat back S2 is connected to the seat surface S1 to be reclinable with respect to the seat surface S1, and the first flexible tube portion F1 further includes the first connection flexible tube portion F13 disposed across the connection portion S4 between the seat surface S1 and the seat back S2. With this configuration, the first connection flexible tube portion F13 having flexibility is disposed across the connection portion between the seat surface S1 and the seat back S2, and thus the first flexible tube portion F1 can be deformed at the first connection flexible tube portion F13 in accordance with the reclining of the seat back S2. Thus, fatigue fracture of the first conduit 31 due to the reclining of the seat back S2 can be suppressed. In other words, the durability of the first conduit 31 can be improved.

In the vehicular seat 100 according to the present embodiment, of side ends of the seat body S10 in the width direction, the side (near side) facing the side surface structure X1 of the vehicle is defined as the first side end SE1 where the first airbag and the first conduit 31 are provided. As described above, the side surface structure X1 is a part of the vehicle, subject to collision at an event of side collision. For this reason, in the case where the vehicular seats 100 are disposed side by side in the vehicle, the seat disposed on the side surface structure X1 side, protection of the occupant against impact from the side surface structure X1 side (near side) has a higher priority than protection against the impact from the adjacent seat side (far side). In the vehicular seat 100, the first side end SE1 where the first airbag 21 inflates and the first flexible tube portion F1 expands is the side facing the side surface structure X1, so that the occupant can be favorably protected from the impact on the side surface structure side. However, the present disclosure is not limited to this configuration, and of both side ends of the seat body in the width direction, the side end on the side (far side) opposite to the side surface structure of the vehicle may be the first side end where the first airbag and the first conduit are disposed.

While the first flexible tube portion F1 is formed by a cloth (fabric) in the present embodiment, the material of the first flexible tube portion of the present disclosure is not limited to cloth, and may be selected from various flexible materials. For example, the first flexible tube portion may be formed by rubber. Still, the cloth is preferably used as the material of the first flexible tube portion because it is less likely to be deteriorated over time. While the first flexible tube portion F1 is formed by a single member in the present embodiment, the first flexible tube portion of the present disclosure may be formed by a plurality of members. For example, the first seat surface side flexible tube portion, the first connection flexible tube portion, and the first back side flexible tube portion may be formed by different members.

Modified Example

Vehicular seats according to modified examples of the first embodiment will be described below. In the explanation of the modified examples, a difference from the vehicular seat 100 described with reference to FIG. 1 to FIG. 8 will be mainly described, and detailed description on the parts similar to those of the vehicular seat will be omitted.

First Modified Example

Figure 9:
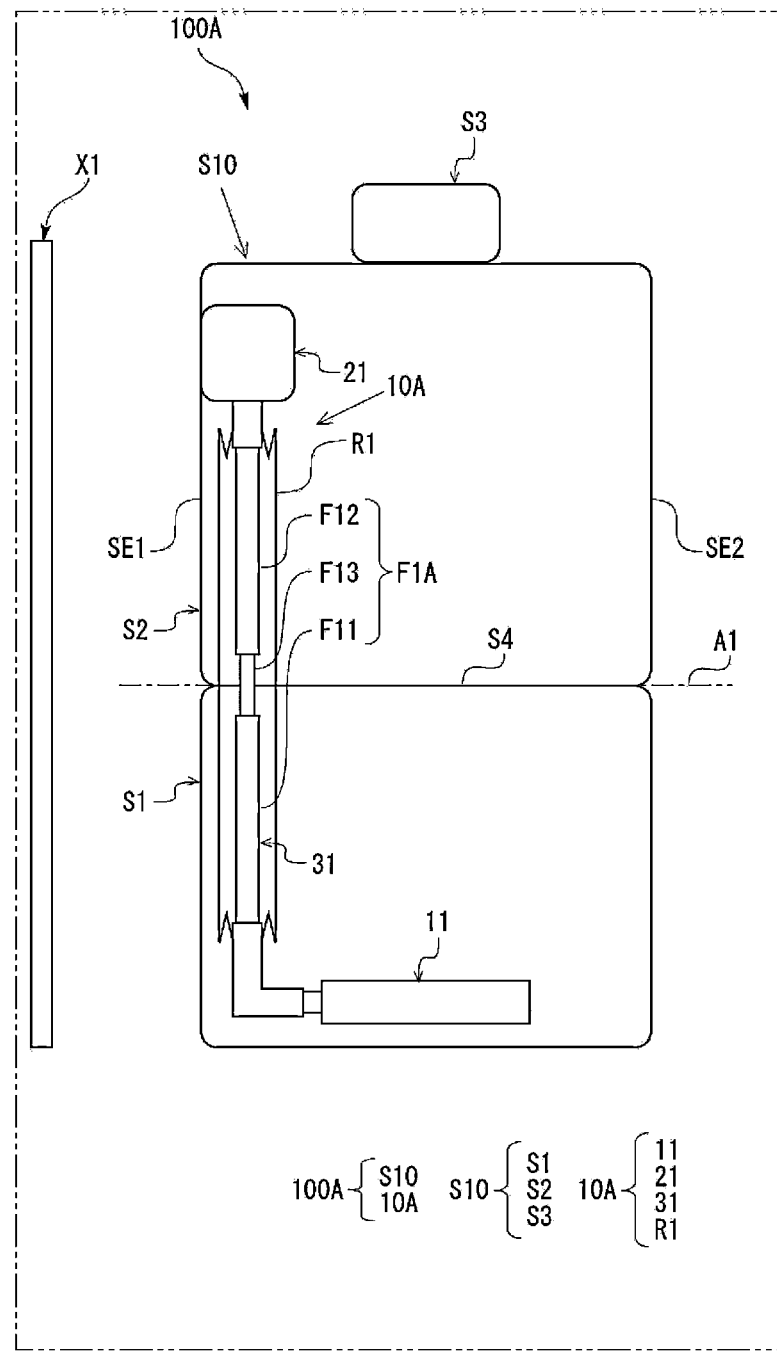
FIG. 9 is a schematic view illustrating a vehicular seat before an airbag device is operated according to a first modified example of the first embodiment.
Figure 10:
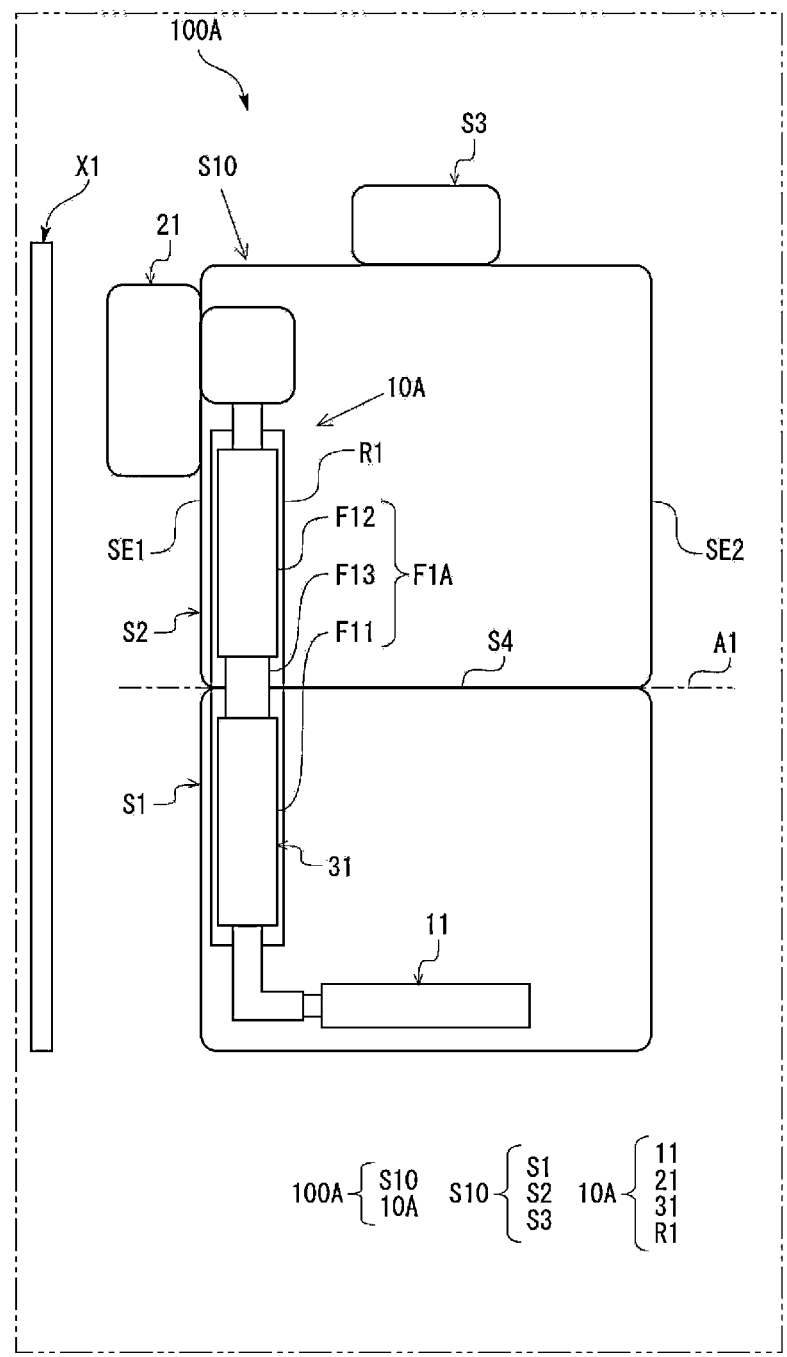
FIG. 10 is a schematic view illustrating the vehicular seat after the airbag device is operated according to the first modified example of the first embodiment.

FIG. 9 is a schematic view illustrating a vehicular seat before the airbag device is operated according to a first modified example of the first embodiment. FIG. 10 is a schematic view illustrating the vehicular seat when the airbag device is operated, according to the first modified example. In an airbag device 10A of a vehicular seat 100A according to the first modified example, a first flexible tube portion F1A is formed by rubber having elasticity. With this configuration, the first flexible tube portion F1A is in a deflated state when no gas is passing therethrough, and is expanded when gas passes therethrough by the pressure of the gas, to increase the flow path cross-sectional area. The airbag device 10A further includes a regulating member R1 that regulates further expansion of the first flexible tube portion F1A that has expanded to a predetermined size, as illustrated in FIG. 9 and FIG. 10. Here, the predetermined size is a size required for the first flexible tube portion F1A to deform the seat body S10 for correcting the posture of the occupant. The regulating member R1 is disposed to surround the first flexible tube portion F1A, and is folded before the airbag device 10 is operated, as illustrated in FIG. 9. When the airbag device 10 operates to make the gas pass through the first flexible tube portion F1A, the regulating member R1 inflates as the first flexible tube portion F1A expands, to regulate the expansion of the first flexible tube portion F1A over the predetermined size, as illustrated in FIG. 10. Thus, the first flexible tube portion F1A formed by rubber can be prevented from rupturing by being excessively expanded by the pressure of the gas.

Second Modified Example

Figure 11:
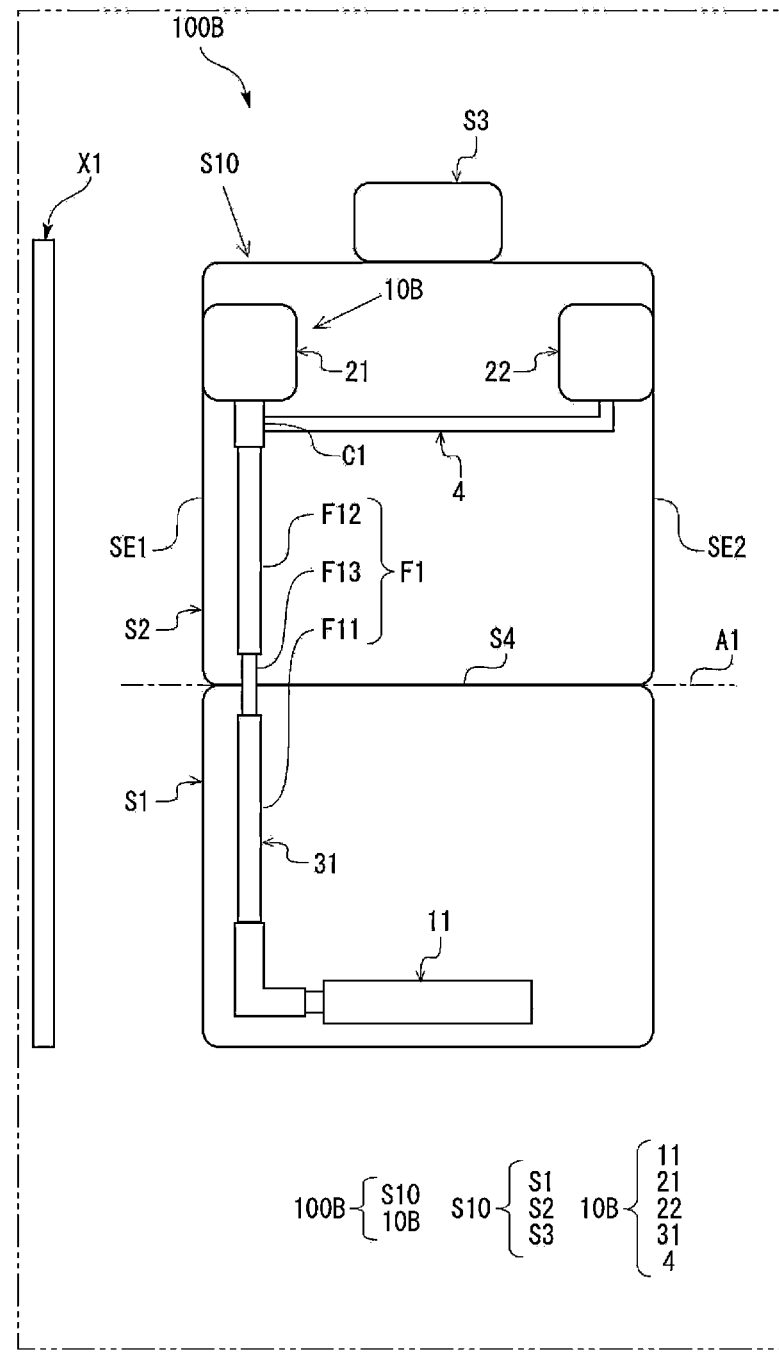
FIG. 11 is a schematic view illustrating a vehicular seat before an airbag device is operated according to a second modified example of the first embodiment.
Figure 12:
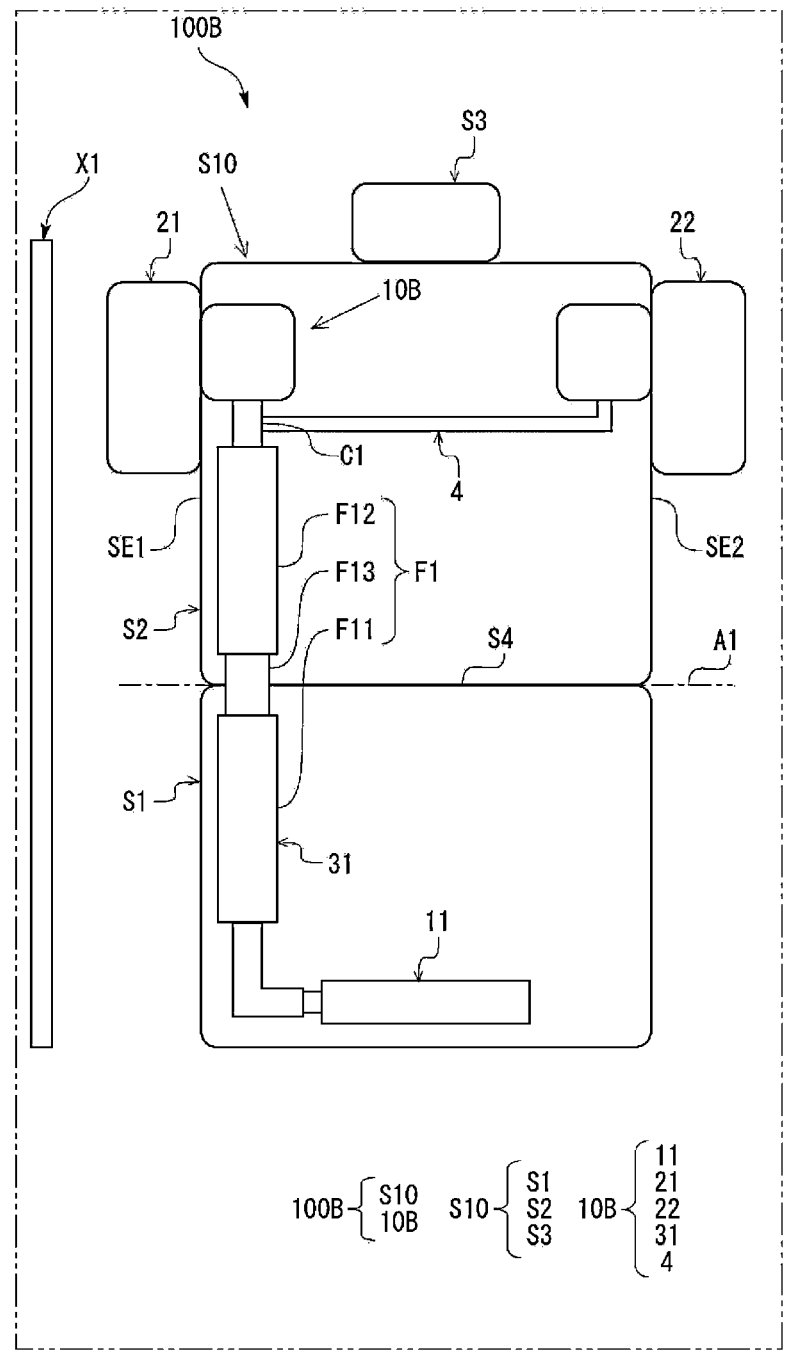
FIG. 12 is a schematic view illustrating the vehicular seat after the airbag device is operated according to the second modified example of the first embodiment.

FIG. 11 is a schematic view illustrating a vehicular seat before the airbag device is operated according to a second modified example of the first embodiment. FIG. 12 is a schematic view illustrating the vehicular seat when the airbag device is operated, according to the second modified example. As illustrated in FIG. 11 and FIG. 12, an airbag device 10B of a vehicular seat 100B according to the second modified example includes a second airbag 22 and a connection tube 4 in addition to the configuration of the airbag device 10 of the vehicular seat 100 described above.

The second airbag 22 is a shoulder or an torso airbag on the second side end SE2 side, that is a far-side airbag, and is provided (stored) inside the seat back S2 so as to correspond to the shoulder or the chest of the occupant. As illustrated in FIG. 12, the second airbag 22 protrudes and inflates from the second side end SE2 of the seat body S10 (seat back S2), upon being expanded by the gas supplied from the first gas generator 11. With the second airbag 22 that inflates to the outside of the seat back S2 on the second side end SE2, the shoulder or the chest of the occupant is held on the second side end SE2 side.

The connection tube 4 is a flow tube through which the gas can flow, and connects the first conduit 31 and the second airbag 22 to each other, so that the gas flowing through the first conduit 31 is supplied to the second airbag 22 after the first airbag 21. Reference numeral Cl in FIG. 11 and FIG. 12 denotes a coupling portion between the first conduit 31 and the connection tube 4. Part of the gas flowing through the first conduit 31 flows to the connection tube 4 from the coupling portion Cl and is supplied to the second airbag 22, and the remaining gas is supplied to the first airbag 21. In the vehicular seat 100B, the length of the connection tube 4 and the coupling position between the first conduit 31 and the connection tube 4 are set so that the flow path through which the gas reaches the second airbag 22 from the coupling portion Cl is longer than the flow path through which the gas reaches the first airbag 21 from the coupling portion C1. Thus, the gas flowing to the connection tube 4 from the coupling portion C1 is supplied to the second airbag 22 after the gas is supplied to the first airbag 21. Therefore, in the vehicular seat 100B, the gas is supplied to the first flexible tube portion, the first airbag 21, and the second airbag 22 in this order.

Here, when the first airbag 21 inflates to protect the occupant from the impact on the first side end SE1 side (near side), the occupant may lean to the second side end SE2 side (far side) due to the reaction against the impact. In view of this, in the vehicular seat 100B, the connection tube 4 supplies the gas to the second airbag 22 after the first airbag 21, and thus the second airbag 22 can inflate after the first airbag 21 inflates. In view of this, the first flexible tube portion F1 first expands to correct the posture of the occupant, and then the first airbag 21 inflates to protect the occupant from the impact on the near side. Then, the second airbag 22 inflates to hold the occupant, thereby protecting the occupant leaning to the far side due to the reaction against the impact from the near side. That is, the second airbag 22 inflates at a timing when the occupant leans to the second side end SE2, whereby the occupant can be more reliably protected. With the vehicular seat 100B, the first airbag 21 and the second airbag 22 inflate at different timings. Thus, when the vehicular seats 100B are disposed in the vehicle side by side, interference caused by simultaneous inflation of the first airbag 21 and the second airbag 22 of the seats adjacent to each other can be prevented.

Third Modified Example

Figure 13:
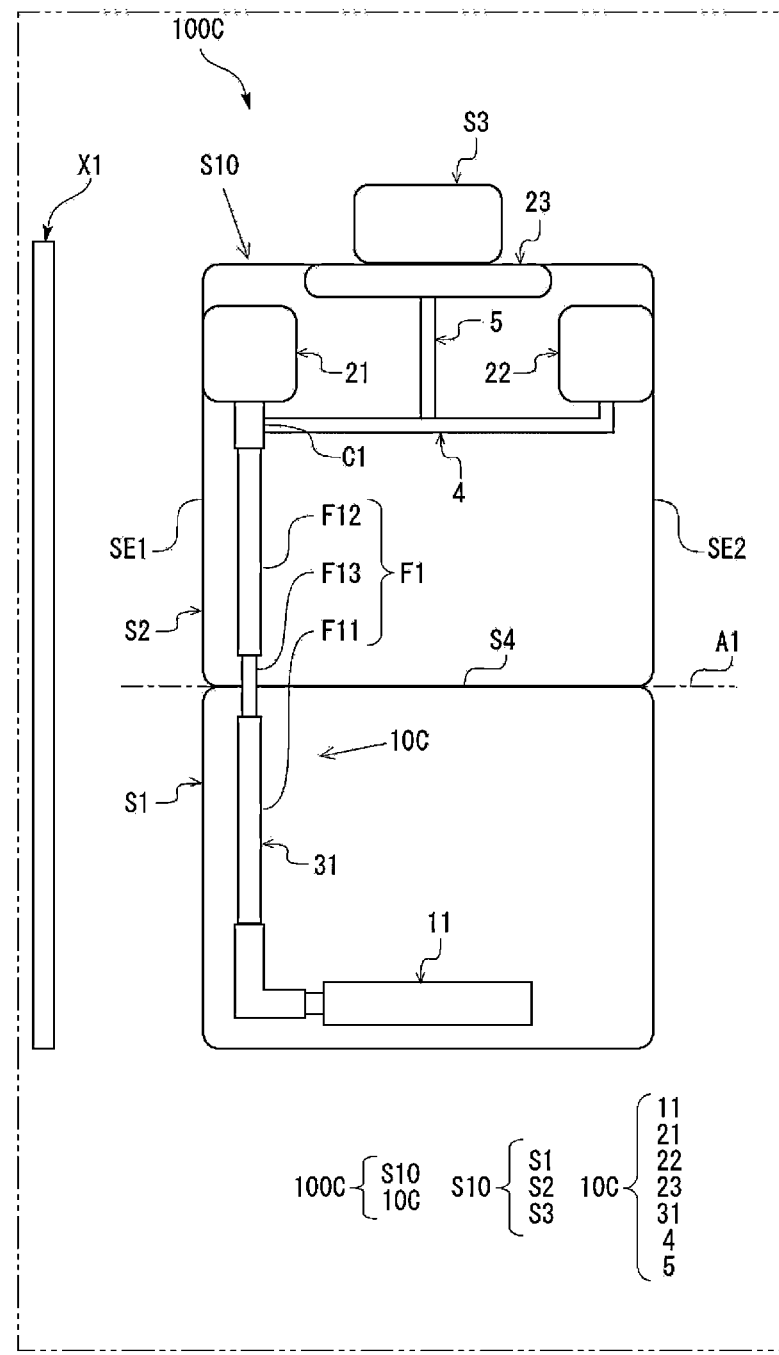
FIG. 13 is a schematic view illustrating a vehicular seat before an airbag device is operated according to a third modified example of the first embodiment.
Figure 14:
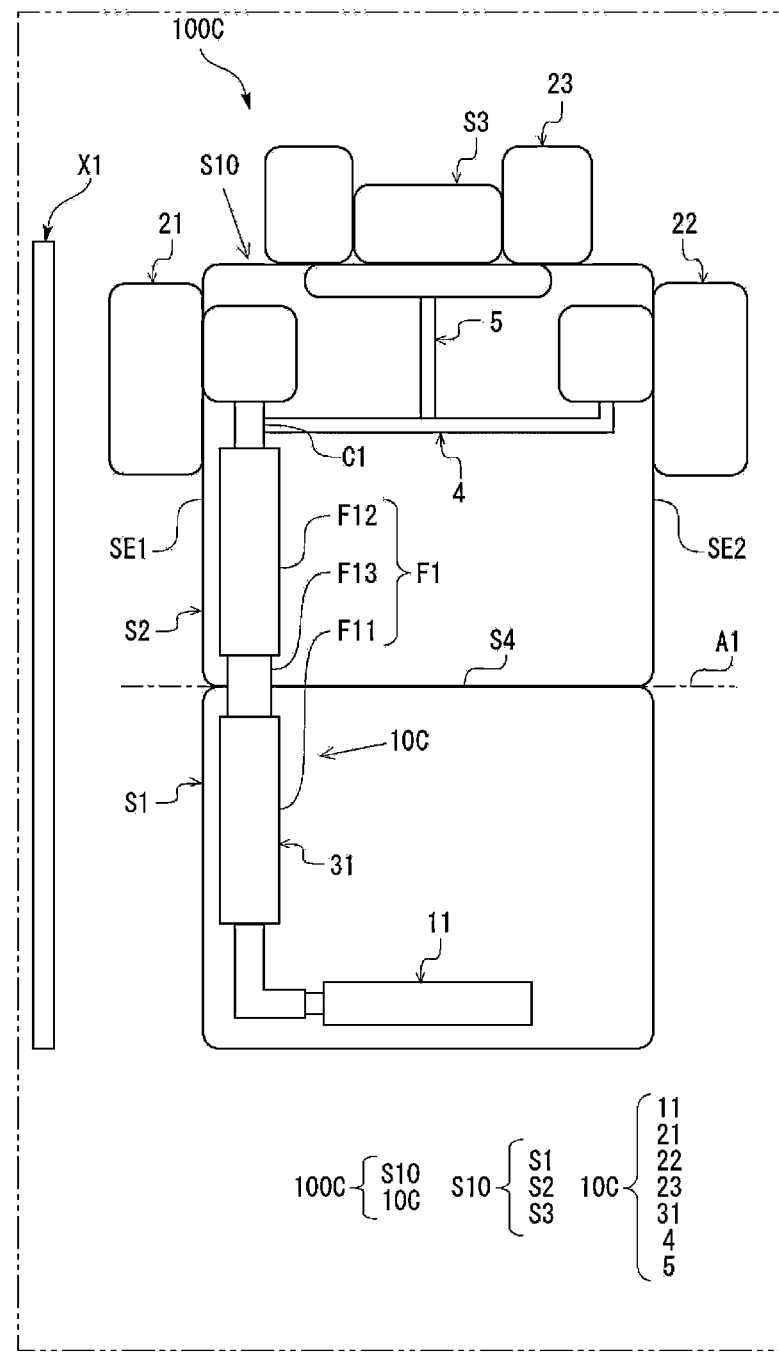
FIG. 14 is a schematic view illustrating the vehicular seat after the airbag device is operated according to the third modified example of the first embodiment.

FIG. 13 is a schematic view illustrating a vehicular seat before the airbag device is operated according to a third modified example of the first embodiment. FIG. 14 is a schematic view illustrating the vehicular seat when the airbag device is operated, according to the third modified example. As illustrated in FIG. 13 and FIG. 14, an airbag device 10C of a vehicular seat 100C according to the third modified example includes a third airbag 23 and a branch tube 5 in addition to the configuration of the airbag device 10B of the vehicular seat 100B described above.

The third airbag 23 is a head airbag of the occupant, and is provided (stored) inside the seat back S2 so as to correspond to the head of the occupant. As illustrated in FIG. 14, the third airbag 23 protrudes from the upper end portion of the seat body S10 (seat back S2) and inflates on both sides of the headrest S3 in the width direction, upon being expanded by the gas supplied from the first gas generator 11. The third airbag 23 inflates to the outside from the upper end portion of the seat back S2 to protect the head of the occupant on both left and right sides.

The branch tube 5 is a flow tube through which the gas can flow, and is a tube branched from an intermediate part of the connection tube 4 and connected to the third airbag 23. Thus, part of the gas flowing through the connection tube 4 flows in the branch tube 5 and is supplied to the third airbag 23, and the remaining gas is supplied to the second airbag 22. In the vehicular seat 100C, the lengths of the connection tube 4 and the branch tube 5 and the coupling position between the first conduit 31, the connection tube 4, and the branch tube 5 are set so that the flow path through which the gas reaches the third airbag 23 from the coupling portion C1 is longer than the flow path through which the gas reaches the first airbag 21 from the coupling portion C1. Thus, the gas guided to the third airbag 23 through the branch tube 5 is supplied to the third airbag 23 after the gas is supplied to the first airbag 21. Thus, in the vehicular seat 100C, the second airbag 22 and the third airbag 23 inflate after the inflation of the first airbag 21.

Here, when the first airbag 21 and the second airbag 22 protect the upper body of the occupant in a state in which the occupant's head is shaken by the impact of the side collision, a load may be applied to the occupant's neck. In view of this, with the vehicular seat 100C, the third airbag 23 protects the head of the occupant in addition to protecting the upper body M2 of the occupant by the first airbag 21 and the second airbag 22, whereby the load to the neck of the occupant can be reduced. As a result, the occupant can be more reliably protected.

Second Embodiment

Figure 15:
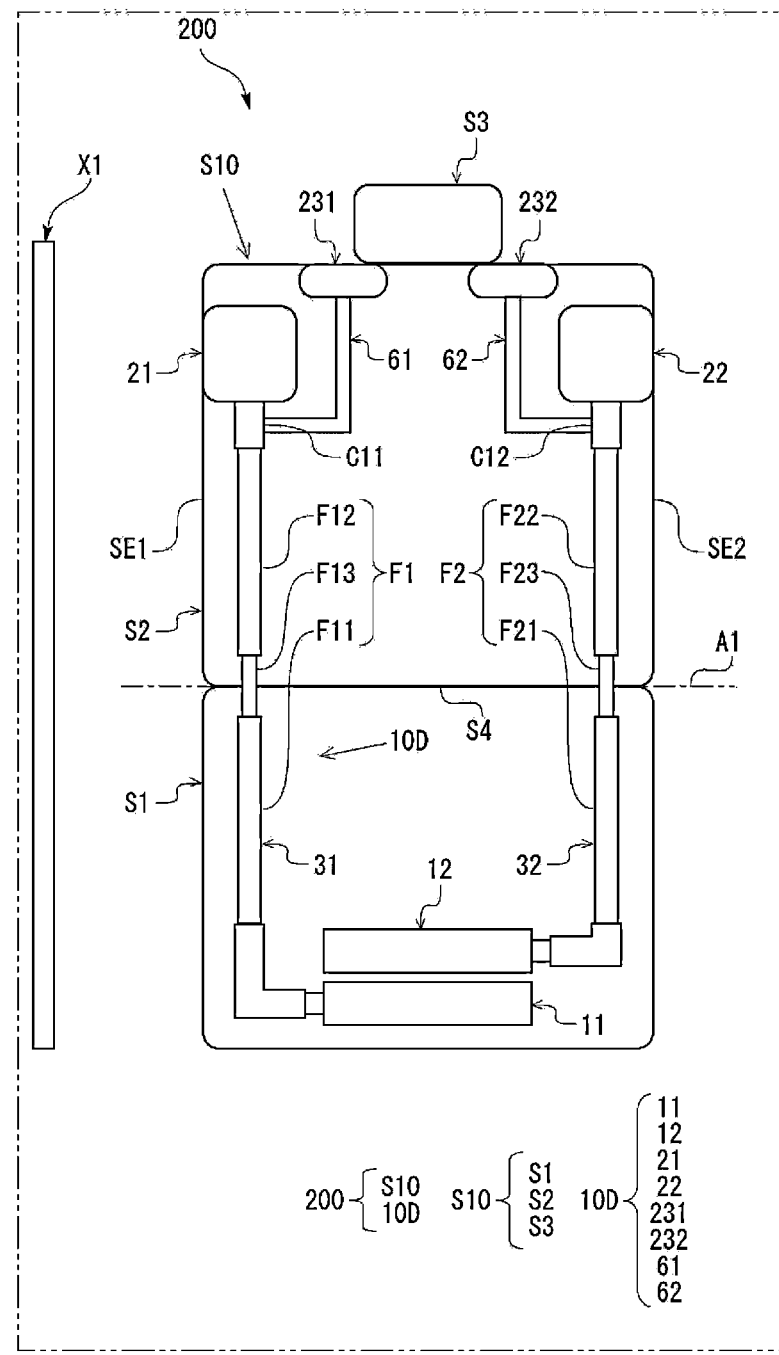
FIG. 15 is a schematic view illustrating a vehicular seat before an airbag device is operated according to a second embodiment.
Figure 16:
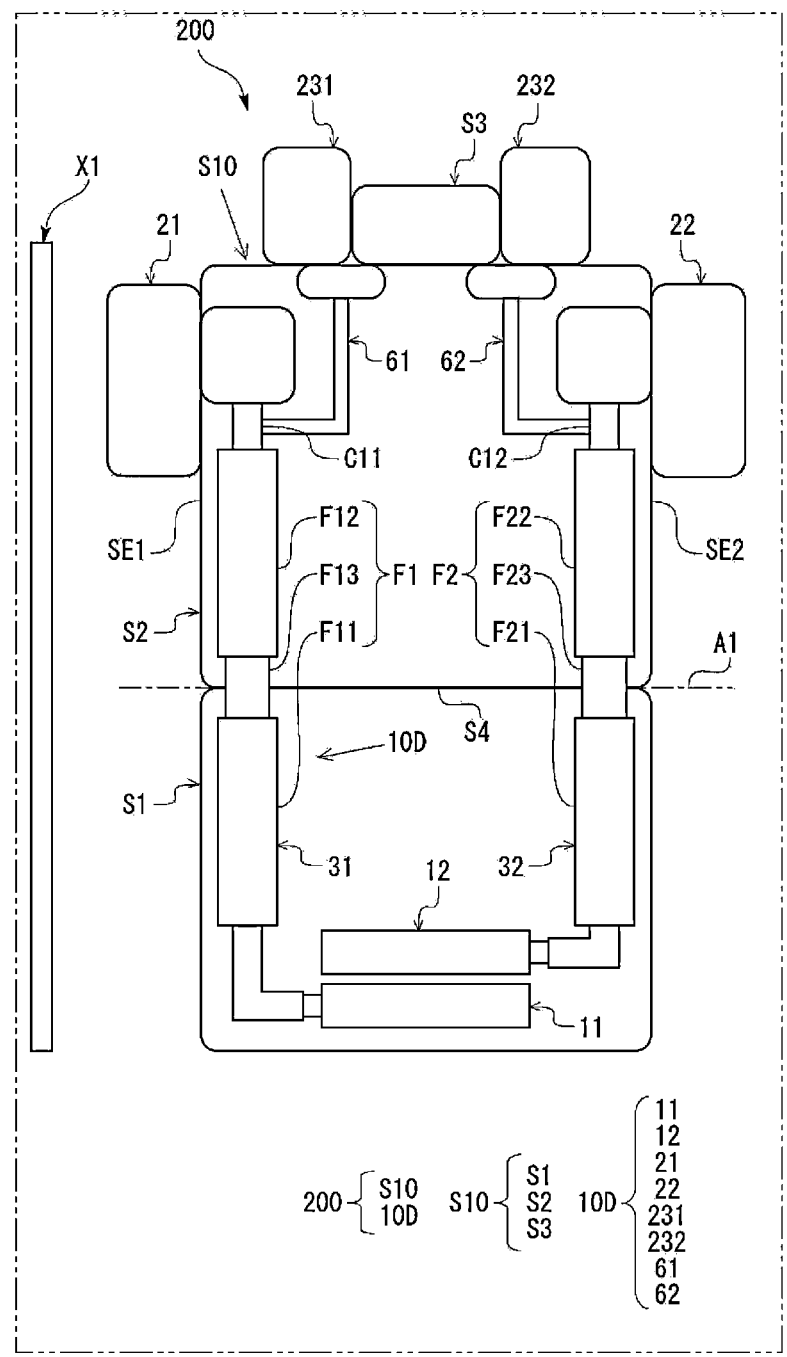
FIG. 16 is a schematic view illustrating the vehicular seat after the airbag device is operated according to the second embodiment.

A vehicular seat according to a second embodiment will be described below. In the explanation of the second embodiment, a difference from the vehicular seat 100 described with reference to FIGS. 1 to 8 will be mainly described, and detailed description on the parts similar to those of the vehicular seat 100 will be omitted. FIG. 15 is a schematic view illustrating a vehicular seat before an airbag device is operated according to a second embodiment. FIG. 16 is a schematic view illustrating the vehicular seat when the airbag device is operated according to the second embodiment. As illustrated in FIG. 15 and FIG. 16, an airbag device 10D of a vehicular seat 200 according to the second embodiment includes a second gas generator 12, the second airbag 22, a second conduit 32, third airbags 231 and 232, and connection tubes 61 and 62, in addition to the configuration of the airbag device of the vehicular seat 100 described above.

The second gas generator 12 is provided inside the seat surface S1 of the seat body S10, and supplies gas to the second airbag 22. The second gas generator 12 has configuration similar to that of the first gas generator 11, but operates independently from the first gas generator 11 under the control of the airbag ECU.

The second airbag 22 according to the second embodiment protrudes and inflates from the second side end SE2 of the seat body S10 (seat back S2), upon being expanded by the gas supplied from the second gas generator 12. Thus, the shoulder or the chest of the occupant is held from the second side end SE2 side.

The second conduit 32 is a flow tube through which the gas can flow, and is configured to guide the gas from the second gas generator 12 to the second airbag 22. As illustrated in FIG. 15 and FIG. 16, the second conduit 32 has one end connected to the second gas generator 12 and has the other end connected to the second airbag 22. Part of the second conduit 32 is formed as a second flexible tube portion F2 having flexibility, and is disposed inside the seat body S10 and along the second side end SE2. More specifically, the second flexible tube portion F2 is disposed to be positioned between the second side end SE2 and the occupant seated on the vehicular seat 200. The second flexible tube portion F2 has a configuration similar to that of the first flexible tube portion F1, and is in a deflated or folded state when no gas is passing therethrough, and is expanded, when gas passes therethrough by the pressure of the gas, to increase the flow path cross-sectional area. The second flexible tube portion F2 includes a second seat surface side flexible tube portion F21, a second back side flexible tube portion F22, and a second connection flexible tube portion F23. The second seat surface side flexible tube portion F21 is disposed inside the seat surface S1 and along the second side end SE2. The second back side flexible tube portion F22 is disposed inside the seat back S2 and along the second side end SE2. The second connection flexible tube portion F23 is disposed across a connection portion S4 between the seat surface S1 and the seat back S2. In the second flexible tube portion F2, the second seat surface side flexible tube portion F21, the second connection flexible tube portion F23, and the second back side flexible tube portion F22 are integrally formed by a single member. In the flow path in which the gas flows from the second gas generator 12 to the second airbag 22, the second back side flexible tube portion F22 is positioned downstream of the second seat surface side flexible tube portion F21, and a downstream end portion of the second seat surface side flexible tube portion F21 and an upstream end portion of the second back side flexible tube portion F22 are connected to each other through the second connection flexible tube portion F23.

The second flexible tube portion F2 is configured to be expanded by the gas passing therethrough, to deform the seat body S10. At this time, since the second flexible tube portion F2 is disposed along the second side end SE2 inside the seat body S10, the deformation of the seat body S10 caused by the expansion of the second flexible tube portion F2 can correct the seated posture closer to the second side end SE2 (closer to the far side) than the proper posture, to the proper posture. Since the second flexible tube portion F2 includes the second seat surface side flexible tube portion F21 disposed along the second side end SE2 of the seat surface S1, and the second back side flexible tube portion F22 disposed along the second side end SE2 of the seat back S2, the postures of the lower body M1 and the upper body M2 of the occupant can both be corrected. Since the second flexible tube portion F2 is formed by at least part of the second conduit 32 that guides the gas from the second gas generator 12 to the second airbag 22, the posture of the occupant can be corrected by the expansion of the second flexible tube portion F2 before the expansion of the second airbag 22. Thus, the second airbag 22 can inflate so as to correspond to the shoulder or the chest, which is an intended body part, of the occupant on the second side end SE2 side. As a result, according to the vehicular seat 200, the effect of the second airbag 22 can be sufficiently exerted, and the occupant can be reliably protected.

The third airbags 231 and 232 are airbags for the head of the occupant, and are provided (stored) inside the seat back S2 so as to correspond to the head of the occupant. The third airbag 231 is an airbag that inflates in conjunction with the inflation of the first airbag 21, and as illustrated in FIG. 16, the third airbag 231 protrudes from the upper end portion of the seat body S10 (seat back S2) to inflate on the first side end SE1 side of the headrest S3, upon being inflated by the gas supplied from the first gas generator 11. The third airbag 232 is an airbag that inflates in conjunction with the inflation of the second airbag 22, and as illustrated in FIG. 16, the third airbag 232 protrudes from the upper end portion of the seat body S10 (seat back S2) to inflate on the second side end SE2 side of the headrest S3, upon being inflated by the gas supplied from the second gas generator 12. With the third airbags 231 and 232 inflating to the outside from the upper end portion of the seat back S2 to hold the head of the occupant, the head of the occupant is protected.

The connection tubes 61 and 62 are flow tubes through which the gas can flow. The connection tube 61 connects the first conduit 31 and the third airbag 231 to each other, so that the gas flowing through the first conduit 31 is supplied to the third airbag 231 after the gas is supplied to the first airbag 21. The connection tube 62 connects the second conduit 32 and the third airbag 232 to each other, so that the gas flowing through the second conduit 32 is supplied to the third airbag 232 after the gas is supplied to the second airbag 22. In FIG. 15 and FIG. 16, reference numeral C11 denotes a coupling portion between the first conduit 31 and the connection tube 61, and reference numeral C12 denotes a coupling portion between the second conduit 32 and the connection tube 62. In the vehicular seat 200, the flow path through which the gas reaches the third airbag 231 from the coupling portion C11 is set to be longer than the flow path through which the gas reaches the first airbag 21 from the coupling portion C11. Furthermore, the flow path through which the gas reaches the third airbag 232 from the coupling portion C12 is set to be longer than the flow path through which the gas reaches the second airbag 22 from the coupling portion C12. Thus, the gas is supplied to the third airbag 232 after the gas is supplied to the first airbag 21, and the gas is supplied to the third airbag 231 after the gas is supplied to the second airbag 22. Thus, in the vehicular seat 200, the third airbag 231 inflates after the first airbag 21 inflates, and the third airbag 232 inflates after the second airbag 22 inflates.

In the vehicular seat 200 according to the second embodiment, the gas is supplied to the second airbag 22 using the second gas generator 12 that is different from the first gas generator 11 for supplying gas to the first airbag 21, and thus the second airbag 22 can inflate independently from the first airbag 21. That is, the occupant can be protected from impact on the second side end SE2 side (far side) with the second airbag 22 inflated without supplying the gas to the first airbag 21. For example, a sensor may detect from which direction of the first side end SE1 side and the second side end SE2 side the impact is received, and of the first gas generator 11 and the second gas generator 12, a gas generator that inflates the airbag corresponding to the direction of the impact may be operated. Furthermore, the airbag corresponding to the direction of the impact may inflate first, and then the airbag on the opposite side may inflate to protect the occupant leaning to the opposite side due to the reaction against the impact. For example, when the sensor detects that an impact has been received from the first side end SE1 side (near side) at an event of side collision of the vehicle having the side surface structure X1, the first gas generator 11 may be operated first to inflate the first airbag 21 and the third airbag 231 to protect the occupant from the impact on the first side end SE1 side, and then the second gas generator 12 may be operated to inflate the second airbag 22 and the third airbag 232 to protect the occupant leaning to the second side end SE2 side. With this configuration, the seated posture of the occupant is corrected by the first flexible tube portion F1 and the second flexible tube portion F2, whereby the effect of the airbag can be sufficiently exerted and the occupant can be reliably protected.

Third Embodiment

Figure 17:
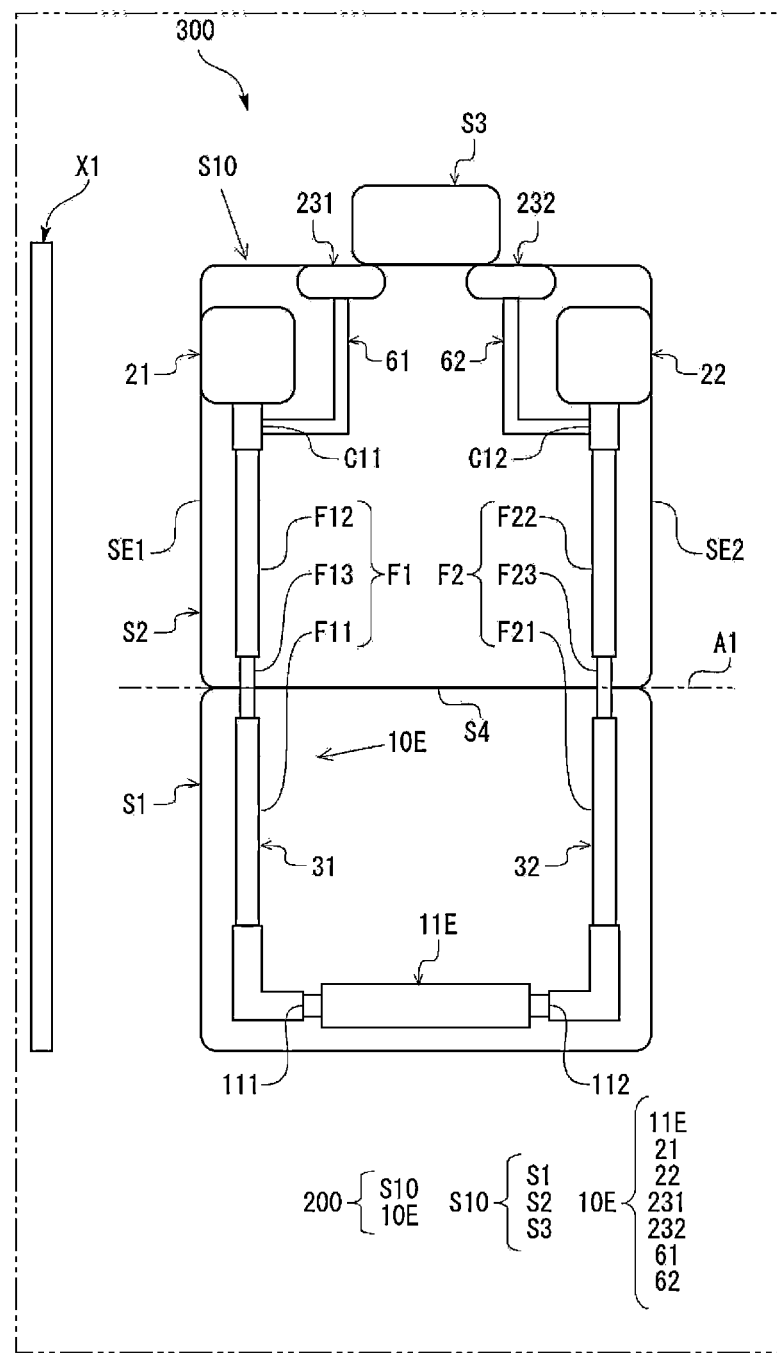
FIG. 17 is a schematic view illustrating a vehicular seat before an airbag device is operated according to a third embodiment.

A vehicular seat according to a third embodiment will be described below. In the explanation of the third embodiment, a difference from the vehicular seat 200 according to the second embodiment described with reference to FIG. 15 and FIG. 16 will be mainly described, and detailed description on the parts similar to those of the vehicular seat 200 will be omitted. FIG. 17 is a schematic view illustrating a vehicular seat before an airbag device is operated according to a third embodiment. As illustrated in FIG. 17, an airbag device 10E of a vehicular seat 300 according to the third embodiment is different from the airbag device 10D of the vehicular seat 200 described above, in that a first gas generator 11E is provided instead of the first gas generator 11 and the second gas generator 12.

As illustrated in FIG. 17, the first gas generator 11E includes a first gas discharge port 111 to which the first conduit 31 is connected, and a second gas discharge port 112 to which the second conduit 32 is connected and which is independent from the first gas discharge port 111. The first gas discharge port 111 and the second gas discharge port 112 are independently controlled and activated by an activation device attached to each of them to open for emitting the gas.

In the vehicular seat 300 according to the third embodiment, the gas is supplied to the second airbag 22 through the second gas discharge port 112 different from the first gas discharge port 111 for supplying gas to the first airbag 21. Thus, the second airbag 22 can inflate independently from the first airbag 21. Thus, a similar effect as those of the vehicular seat 200 according to the second embodiment can be obtained. For example, a sensor may detect from which direction of the first side end SE1 side (near side) and the second side end SE2 side (far side) the impact is received, and of the first gas discharge port 111 and the second gas discharge port 112, a gas discharge port that for inflating the airbag corresponding to the direction of the impact may be opened first. Furthermore, the vehicular seat 300 according to the third embodiment can have a simple system, because the gas is supplied to the first airbag 21 and to the second airbag 22, using a single first gas generator 11E.

Others

Suitable embodiments according to the present disclosure have been described above, but each embodiment disclosed in the present specification can be combined with each of the features disclosed in the present specification.

REFERENCE SIGNS LIST

S10 Seat body
S1 Seat surface
S2 Seat back
11 First gas generator
111 First gas discharge port
12 First gas discharge port
12 Second gas generator
21 First airbag
22 Second airbag
23 Third airbag
31 First conduit
32 Second conduit
4 Connection tube
5 Branch tube
F1 First flexible tube portion
F11 First seat surface side flexible tube portion
F12 First back side flexible tube portion
F13 First connection flexible tube portion
F2 First flexible tube portion
10 Airbag device (occupant restraining device)
100 Vehicular seat

The invention claimed is:
1. A vehicular seat on which an occupant of a vehicle sits, the vehicular seat, comprising:
   a seat body including a seat surface that supports buttocks of the occupant and a seat back that supports a back of the occupant;
   a first gas generator provided to the seat body;
   a first airbag that is disposed inside the seat back and, by gas supplied from the first gas generator when the first gas generator operates, protrudes and inflates from a first side end that is one of side ends in a width direction of the seat body; and
   a first conduit configured to guide gas from the first gas generator to the first airbag,
   the first conduit including a first flexible tube portion having flexibility and disposed along the first side end inside at least one of the seat surface or the seat back,
   the first flexible tube portion expanding to deform the seat body when the gas supplied from the first gas generator to the first airbag passes through the first flexible tube portion.
2. The vehicular seat according to claim 1, wherein the first flexible tube portion includes a first seat surface side flexible tube portion disposed along the first side end in the seat surface, and a first back side flexible tube portion disposed along the first side end in the seat back.
3. The vehicular seat according to claim 2, further comprising:
   a second airbag that is disposed inside the seat back, and upon being supplied with the gas from the first gas generator, protrudes and inflates from a second side end that is another one of the side ends in the width direction of the seat body; and
   a connection tube configured to connect the first conduit and the second airbag, so that the gas flowing through the first conduit is supplied to the second airbag after the gas is supplied to the first airbag.
4. The vehicular seat according to claim 2, further comprising:
   a second gas generator provided to the seat body;
   a second airbag that is disposed inside the seat back and, by gas supplied from the second gas generator when the second gas generator operates, protrudes and inflates from a second side end that is another one of the side ends in the width direction of the seat body; and
   a second conduit configured to guide the gas from the second gas generator to the second airbag, wherein
   the second conduit includes a second flexible tube portion having flexibility and disposed along the second side end inside at least one of the seat surface or the seat back, and
   the second flexible tube portion expands to deform the seat body when the gas supplied from the second gas generator to the second airbag passes through the second flexible tube portion.
5. The vehicular seat according to claim 2, further comprising:
   a second airbag that is disposed inside the seat back and, by gas supplied from the first gas generator when the first gas generator operates, protrudes and inflates from a second side end that is another one of the side ends in the width direction of the seat body; and
   a second conduit configured to guide the gas from the first gas generator to the second airbag, wherein
   the first gas generator includes a first gas discharge port to which the first conduit is connected, and a second gas discharge port to which the second conduit is connected, the second gas discharge port being independent from the first gas discharge port,
   the second conduit includes a second flexible tube portion having flexibility and disposed along the second side end inside at least one of the seat surface or the seat back, and the second flexible tube portion expands to deform the seat body when the gas supplied from the first gas generator to the second airbag passes through the second flexible tube portion.

6. The vehicular seat according to claim 2, wherein the seat back is connected to the seat surface so as to be reclinable with respect to the seat surface, and
the first flexible tube portion further includes a first connection flexible tube portion disposed across a connection portion between the seat surface and the seat back.

7. The vehicular seat according to claim 6, wherein, the first seat surface side flexible tube portion, the first connection flexible tube portion, and the first back side flexible tube portion are integrally formed by a single member in the first flexible tube portion.

8. The vehicular seat according to claim 6, further comprising:
a second airbag that is disposed inside the seat back, and upon being supplied with the gas from the first gas generator, protrudes and inflates from a second side end that is another one of the side ends in the width direction of the seat body; and
a connection tube configured to connect the first conduit and the second airbag, so that the gas flowing through the first conduit is supplied to the second airbag after the gas is supplied to the first airbag.

9. The vehicular seat according to claim 6, further comprising:
a second gas generator provided to the seat body;
a second airbag that is disposed inside the seat back and, by gas supplied from the second gas generator when the second gas generator operates, protrudes and inflates from a second side end that is another one of the side ends in the width direction of the seat body; and
a second conduit configured to guide the gas from the second gas generator to the second airbag, wherein
the second conduit includes a second flexible tube portion having flexibility and disposed along the second side end inside at least one of the seat surface or the seat back, and
the second flexible tube portion expands to deform the seat body when the gas supplied from the second gas generator to the second airbag passes through the second flexible tube portion.

10. The vehicular seat according to claim 6, further comprising:
a second airbag that is disposed inside the seat back and, by gas supplied from the first gas generator when the first gas generator operates, protrudes and inflates from a second side end that is another one of the side ends in the width direction of the seat body; and
a second conduit configured to guide the gas from the first gas generator to the second airbag, wherein
the first gas generator includes a first gas discharge port to which the first conduit is connected, and a second gas discharge port to which the second conduit is connected, the second gas discharge port being independent from the first gas discharge port,
the second conduit includes a second flexible tube portion having flexibility and disposed along the second side end inside at least one of the seat surface or the seat back, and
the second flexible tube portion expands to deform the seat body when the gas supplied from the first gas generator to the second airbag passes through the second flexible tube portion.

11. The vehicular seat according to claim 1 further comprising:
a second airbag that is disposed inside the seat back, and upon being supplied with the gas from the first gas generator, protrudes and inflates from a second side end that is another one of the side ends in the width direction of the seat body; and
a connection tube configured to connect the first conduit and the second airbag, so that the gas flowing through the first conduit is supplied to the second airbag after the gas is supplied to the first airbag.

12. The vehicular seat according to claim 11 further comprising:
a third airbag that is disposed inside the seat back, and upon being supplied with the gas from the first gas generator, protrudes and inflates from an upper end portion of the seat body; and
a branch tube that is branched from an intermediate part of the connection tube to guide the gas to the third airbag.

13. The vehicular seat according to claim 11, further comprising:
a coupling portion provided between the first conduit and the connection tube, wherein the flow path through which a gas reaches the second airbag from the coupling portion is longer than a flow path through which the gas reaches the first airbag from the coupling portion.

14. The vehicular seat according to claim 12, further comprising:
a coupling portion provided between the first conduit and the connection tube, wherein a flow path through which a gas reaches the third airbag from the coupling portion is longer than a flow path through which the gas reaches the first airbag from the coupling portion.

15. The vehicular seat according to claim 1 further comprising:
a second gas generator provided to the seat body;
a second airbag that is disposed inside the seat back and, by gas supplied from the second gas generator when the second gas generator operates, protrudes and inflates from a second side end that is another one of the side ends in the width direction of the seat body; and
a second conduit configured to guide the gas from the second gas generator to the second airbag, wherein
the second conduit includes a second flexible tube portion having flexibility and disposed along the second side end inside at least one of the seat surface or the seat back, and
the second flexible tube portion expands to deform the seat body when the gas supplied from the second gas generator to the second airbag passes through the second flexible tube portion.

16. The vehicular seat according to claim 1, further comprising:
a second airbag that is disposed inside the seat back and, by gas supplied from the first gas generator when the first gas generator operates, protrudes and inflates from a second side end that is another one of the side ends in the width direction of the seat body; and
a second conduit configured to guide the gas from the first gas generator to the second airbag, wherein
the first gas generator includes a first gas discharge port to which the first conduit is connected, and a second gas discharge port to which the second conduit is connected, the second gas discharge port being independent from the first gas discharge port, the second conduit includes a second flexible tube portion having flexibility and disposed along the second side end inside at least one of the seat surface or the seat back, and the second flexible tube portion expands to deform the seat body when the gas supplied from the first gas generator to the second airbag passes through the second flexible tube portion.

17. The vehicular seat according to claim 1, wherein the first side end is a side end, of the side ends in the width direction of the seat body, facing a side surface structure of the vehicle in a state where the vehicular seat is installed in the vehicle.

18. An occupant restraining device provided to the vehicular seat that includes a seat body including a seat surface and a seat back, the seat surface supporting buttocks of an occupant of a vehicle, the seat back supporting a back of the occupant, the occupant restraining device, comprising:
- a first gas generator provided to the seat body;
- a first airbag that is disposed inside the seat back and, by gas supplied from the first gas generator when the first gas generator operates, protrudes and inflates from a first side end that is one of side ends in a width direction of the seat body; and
- a first conduit configured to guide the gas from the first gas generator to the first airbag,
- the first conduit at least including a first flexible tube portion having flexibility and disposed along the first side end inside at least one of the seat surface or the seat back,
- the first flexible tube portion expanding to deform the seat body when the gas supplied from the first gas generator to the first airbag passes through the first flexible tube portion.

19. The vehicular seat according to claim 18, further comprising:
- a second gas generator provided to the seat body;
- a second airbag that is disposed inside the seat back and, by gas supplied from the second gas generator when the second gas generator operates, protrudes and inflates from a second side end that is another one of the side ends in the width direction of the seat body; and
- a second conduit configured to guide the gas from the second gas generator to the second airbag, the second conduit at least including a second flexible tube portion having flexibility and disposed along the second side end inside at least one of the seat surface or the seat back, the second flexible tube portion expanding to deform the seat body when the gas supplied from the second gas generator to the second airbag passes through the second flexible tube portion.

* * * * *